(12) United States Patent
Thompson et al.

(10) Patent No.: US 12,359,152 B2
(45) Date of Patent: Jul. 15, 2025

(54) METHODS FOR STERILIZING FERMENTED BEVERAGES

(71) Applicant: MARK ANTHONY INTERNATIONAL SRL, St. Michael (BB)

(72) Inventors: Tracy L. Thompson, Sudbury (CA); Anthony C. Vieira, East Dennis, MA (US); Michael G. Ptasznik, Lake Saint Louis, MO (US); David G. Fox, Chicago, IL (US); Jacob M. Mattson, Bellevue, NE (US)

(73) Assignee: MARK ANTHONY INTERNATIONAL SRL, St. Michael (BB)

( * ) Notice: Subject to any disclaimer, the term of this patent is extended or adjusted under 35 U.S.C. 154(b) by 474 days.

(21) Appl. No.: 17/525,066

(22) Filed: Nov. 12, 2021

(65) Prior Publication Data
US 2022/0154117 A1    May 19, 2022

Related U.S. Application Data

(60) Provisional application No. 63/196,730, filed on Jun. 4, 2021, provisional application No. 63/113,873, filed on Nov. 14, 2020.

(51) Int. Cl.
C12H 1/16    (2006.01)
C12C 11/00    (2006.01)
(52) U.S. Cl.
CPC ............ *C12H 1/165* (2013.01); *C12C 11/003* (2013.01)
(58) Field of Classification Search
CPC ....... C12C 12/00; C12C 11/11; C12C 11/003; C12H 1/165; C12H 1/00
See application file for complete search history.

(56) References Cited

U.S. PATENT DOCUMENTS 4,317,041 A    2/1982    Schenck
4,440,795 A    4/1984    Goldstein et al.
(Continued)

FOREIGN PATENT DOCUMENTS

CA        1034064        7/1978
DE    102012207753 A1    11/2013
(Continued)

OTHER PUBLICATIONS

International Search Report and Written Opinion dated May 11, 2022 in related International Application No. PCT/IB2021/000817 filed Nov. 12, 2021 (14 pages).
(Continued)

*Primary Examiner* — Vera Stulii
(74) *Attorney, Agent, or Firm* — Daniel F. Nesbitt; Nesbitt IP LLC

(57) ABSTRACT

Methods and systems in a process for disinfecting or sterilizing a fermented beverage and/or a composition utilized in a fermentation process to produce a fermented beverage, using ultraviolet light. Such methods and systems can be coupled with processes for neutralizing unwanted acidic congeners and separating the resulting salts of the acidic congeners to produce a refined fermented beverage, including but not limited to a neutral malt base, gluten-free base, gluten-reduced base, grain-neutral spirit, wine base, and a sugar-brew base. Drinkable fermented beverages, including but not limited to flavored malt beverages and hard seltzer beverages, can also be disinfected or sterilized with ultraviolet light using any of the systems or methods described herein.

14 Claims, 7 Drawing Sheets

(56) References Cited

U.S. PATENT DOCUMENTS

| | | | |
|---|---|---|---|
| 4,482,809 | A | 11/1984 | Maarschalkerweerd |
| 4,495,204 | A | 1/1985 | Weaver et al. |
| 4,872,980 | A | 10/1989 | Maarschalkerweerd |
| 5,006,244 | A | 4/1991 | Maarschalkerweerd |
| 5,073,396 | A | 12/1991 | Todd, Jr. |
| 5,294,450 | A | 3/1994 | Word et al. |
| 5,418,370 | A | 5/1995 | Maarschalkerweerd |
| 5,539,210 | A | 7/1996 | Maarschalkerweerd |
| 5,618,572 | A | 4/1997 | Tripp et al. |
| 5,846,437 | A | 12/1998 | Whitby et al. |
| 5,866,910 | A | 2/1999 | Cooke et al. |
| 5,994,705 | A | 11/1999 | Cooke et al. |
| 6,015,229 | A | 1/2000 | Cormack et al. |
| 6,916,452 | B1 | 7/2005 | Rix et al. |
| 7,008,652 | B2 | 3/2006 | Effler |
| 7,166,850 | B2 | 1/2007 | Brunet et al. |
| 7,326,349 | B2 | 2/2008 | Asakawa |
| 7,390,225 | B2 | 6/2008 | Elku et al. |
| 7,695,675 | B2 | 4/2010 | Kaiser et al. |
| 7,985,956 | B2 | 7/2011 | Fraser et al. |
| 8,167,654 | B2 | 5/2012 | Elku et al. |
| 8,766,211 | B2 | 7/2014 | Sasges et al. |
| 10,039,776 | B2 | 8/2018 | Chigurupati et al. |
| 10,745,658 | B2 | 8/2020 | Fox et al. |
| 2004/0213696 | A1 | 10/2004 | Daly |
| 2014/0127354 | A1* | 5/2014 | Pratt ............... C12G 3/022 426/16 |
| 2017/0036974 | A1 | 2/2017 | Peterson et al. |
| 2018/0258376 | A1 | 9/2018 | Groeneveld et al. |
| 2019/0100718 | A1* | 4/2019 | Estes ............... C12C 11/006 |
| 2019/0345424 | A1* | 11/2019 | Fox ............... C02F 1/66 |
| 2021/0032579 | A1 | 2/2021 | Fox et al. |

FOREIGN PATENT DOCUMENTS

| | | | |
|---|---|---|---|
| JP | 2006109830 | A | 4/2006 |
| WO | 2016040967 | A1 | 3/2016 |
| WO | 2020036932 | A1 | 2/2020 |

OTHER PUBLICATIONS

De Keukeleire, D., "Fundamentals of Beer and Hop Chemistry", (2000) Quimica Nov. 23(1):108-112 (5 pages).

Krofta, K., et al., "The Effect of Hop Beta Acids Oxidation Products on Beer Bitterness", Kvasny Prum 59:306-312 (Jul. 2013) (7 pages).

South, J.B., "Variation in pH and Lactate Levels in Malts", (1996) J. Inst. Brew. 102:155-159 (5 pages).

Simpson, W.J., "Ionization Behavior of Hop Compounds and Hop-Derived Compounds", J. Inst. Brew. (Jul.-Aug. 1993) 99:317-326 (10 pages).

Jaskula, B., et al., "A Kinetic Study on the Isomerization of Hop α-Acids", J. Agric. Food Chem. (2008), 56, 6408-6415 (8 pages).

Obi, C.N., "Brewery Contaminants, Challenges and Remedies—A Review", Nigerian Journal of Microbiology (2017), 31(1):3926-3940 (15 pages).

Abbas, Z., et al., "Beer Experiment Report, How Does UV Exposure Affect Beer Taste?", (2014) (8 pages).

Williams, B.D., "Efficacy of Ultraviolet Radiation to Control Lactic Acid Bacteria in Wine Must", All Master's Theses. 279 (2015), (44 pages).

Steenackers, B., et al., "Chemical transformations of characteristic hop secondary metabolites in relation to beer properties and the brewing process: A review", Food Chemistry 172, (Apr. 2015) 742-756 (15 pages).

Raspuzzi, D., "Hop Stands", (Nov. 2015) (1 page).

Tynan, P.J. et al., "Preparation, Purification and Separation by High Performance Liquid Chromatography of Humulinic Acids, Dehydrohumulinic Acids, and Hulupones", J. Inst. Brew., (May-Jun. 1990), vol. 96, pp. 137-141 (5 pages).

Huang, Y., et al., "Kinetic Modeling of Hop Acids during Wort Boiling", International Journal of Bioscience, Biochemistry and Bioinformatics, vol. 3, No. 1, (Jan. 2013), pp. 47-52 (6 pages).

Malowicki, M.G., et al., "Hop Bitter Acid Isomerization and Degradation Kinetics in a Model Wort-Boiling System", A Thesis, Oregon State University, (Sep. 2004) (77 pages).

Krofta, K., et al., "Stability of Hop Beta Acids and Their Decomposition Products during Natural Ageing", Acta Horticulturae, (2013), 1010:221-230 (10 pages).

Mezui, A.M., et al., "Effect of UV-C Disinfection of Beer—Sensory Analyses and Consumer Ranking", J. Inst. Brew. (2010), 116(4), 348-353, (6 pages).

Parkes, S., "Wort Boiling Science", Brew your own, The how-to homebrew beer magazine, https://byo.com, (May 2002) (3 pages).

Gobulukoglue, I., "Pasteurized Equivalent Water by Ultraviolet Light", Aquafine™, Process Expo, (Sep. 2017) (58 pages).

U.S. Appl. No. 16/927,744, filed Jul. 13, 2020, Mark Anthony International SRL.

* cited by examiner

METHODS FOR STERILIZING FERMENTED BEVERAGES

CROSS-REFERENCE TO RELATED APPLICATIONS

This application claims the benefit of U.S. Provisional Application No. 63/113,873 filed on Nov. 14, 2021 and U.S. Provisional Application No. 63/196,730 filed Jun. 4, 2021, the disclosure of which are incorporated herein by reference in their entirety.

FIELD OF THE INVENTION

The present invention relates to the inactivation of microbial contaminants within fermented beverages, including those containing hop acids, with ultraviolet light.

BACKGROUND OF THE INVENTION

Traditional fermentation processes undergo several treatment steps to convert malted barley and other grains into a wort or wort extract that can be fermented to form a raw fermentation product, which can be further processed to form drinkable fermented beverages (FB) such as beer and malt beverages. One example of an FB is a neutral malt base (NMB), an ideally colorless, flavorless, and odorless solution that can be further processed to formulate malt beverages of varying flavors. Such processes are described in detail in U.S. Pat. Nos. 4,440,795, 5,294,450, 5,618,572, and 7,008,652, as well as U.S. Patent Publication 2014/0127354, the disclosures of which are incorporated by reference in their entireties.

Beverages based on barley have been historically produced in a malt house, converting barley to malted barley. Malting involves steeping of barley kernels to promote germination, followed by kiln drying at elevated temperatures. The malt may be partly substituted by starch-rich adjuncts, such as rice, corn, or wheat. Upon steeping a slurry of the malted barley and water (a "mash") at a temperature of 60° C. or more, enzymes within in the malt digest starches and other proteins to form a mixture of sugars consisting mostly of mono-, di-, and trisaccharides, as well as peptides and amino acids. The mash is then filtered to produce a sugar-rich mixture called a wort. The wort can then be further boiled and blended in specific percentages with other sugars and added hops to produce the final fermentation substrate that can be combined with yeast to produce ethyl alcohol. Alternatively, the wort can be concentrated upon heating or applying a vacuum to evaporate water from the mixture and form a liquid malt extract, or dried completely to form a dry malt extract. Either malt extract can be packaged and stored for a period of time until being added to a fermentation mixture. Multiple examples of producing a hopped wort for inclusion in a fermentation mixture is described in Canadian Patent No. 1,034,064 and U.S. Pat. No. 4,495,204, both of which are incorporated by reference in their entireties.

To reduce or prevent microbial contamination, it is common within the brewmaking industry to treat the wort, the FB, and/or other intermediates formed in the production of FB. One treatment method is pasteurization, particularly flash pasteurization. Flash pasteurization typically requires a liquid composition to be subjected to high temperatures (about 60-70° C., or higher) for a short period of time (about 15-30 seconds), followed by rapid cooling to low temperatures (about 4-5° C.). Most commonly, the completed FB is flash pasteurized immediately prior to bottling or packaging, extending the FB's shelf life potentially several months, although flash pasteurization can be employed at any point in the production in order to prevent microorganisms (for example, *Lactobacillus, Pediococcus*, and *Acetobacter* bacteria) from producing unwanted congeners that can affect the odor and/or taste of the final FB. However, flash pasteurization, particularly on a large scale, can be a high-maintenance, capital- and labor-intensive, time-consuming, expensive process. This expense increases dramatically if a brewer requires multiple flash pasteurization systems on a single production line. As a result, there is a need to develop new techniques for treating FBs, particularly in in-line FB production processes, that can minimize or eliminate the need to use flash pasteurization and other resource-intensive microbial decontamination processes.

SUMMARY OF THE INVENTION

The present invention provides methods and systems for using ultraviolet (UV) light to inactivate, disinfect or sterilize microbial populations within fermented beverages (FB), particularly beer-based beverages such as hard seltzers and malt beverages.

In various embodiments, the use of UV light to treat FBs produced by any of the methods or systems described herein can obviate the need to boil and/or flash pasteurize the FB to kill a portion or all of the microbial contaminants. Further, UV light can be used at any stage in an FB production process. As non-limiting examples, UV light can be used to treat: water used in the formation of the wort and/or the wort itself; an alcohol-containing raw fermentation product; a bright beer; a treated bright beer; an NMB or GFB; a final drinkable FB; and/or any of the intermediates formed during the course of the production of the drinkable FB, including but not limited to a flavored NMB or GFB.

In various embodiments, methods for reducing or eliminating a microbial contaminant within an FB can comprise the steps of: (a) providing an FB comprising a microbial contaminant, the microbial contaminant comprising one or more microorganisms selected from the group consisting of yeast, mold, viruses, bacteria, and combinations thereof; and (b) illuminating the FB with UV light for a time sufficient to kill at least a portion of the microbial contaminant within the FB, forming a UV-treated FB.

In some embodiments, the provided FB comprises compounds derived from fermentation in the presence of hops, including but not limited to the hop acid products, humulone and lupulone, and their isomers. In some embodiments, the method comprises treating the FB comprising hop acid products with UV light, resulting in the photocatalysis of humulone compounds to form thiols. In a further embodiment, the method can further comprise the step of separating photocatalyzed hop acid products from a UV-treated beer using a separation apparatus, particularly a filtration apparatus, and more particularly, ultrafiltration, nanofiltration, or reverse osmosis filtration apparatus, including combinations thereof. Such separation apparatuses are discussed in further detail, below. Without being limited by a particular theory, it is believed that the step of removing or filtering out the compounds that cause lightstruck flavor notes and odors can maintain, or improve, the organoleptic experience of hop-containing FB's.

In various embodiments, a UV-treated and filtered FB has a reduced quantity of hop acids relative to the FB prior to UV-treatment. In some embodiments, the quantity of hop acids contained within the UV-treated and filtered beer is below 100 ppm. In some embodiments, the UV-treated and filtered FB contains no measurable hop acids.

In various embodiments, the UV-treated and filtered FB contains minimal, or zero, thiol compounds, for example, 3-methylbut-2-ene-1-thiol. In some embodiments, the quantity of 3-methylbut-2-ene-1-thiol contained within the UV-treated and filtered beer is below 100 ppb. In some embodiments, the UV-treated and filtered FB contains no measurable 3-methylbut-2-ene-1-thiol.

In various embodiments, a microbial contaminant can be reduced or eliminated from a wort using UV light, according to a method comprising the steps of: (a) providing a wort comprising a microbial contaminant, the microbial contaminant comprising one or more microorganisms selected from the group consisting of yeast, mold, viruses, bacteria, and combinations thereof; and (b) illuminating the wort with UV light for a time sufficient to kill at least a portion of the microbial contaminant within the wort, forming a UV-treated wort.

In various embodiments, upon treating the FB or wort with UV light, at least about 90% (log−1), and up to at least about 99.9999% (log−6) kill of the microbial contaminant can be achieved.

In various embodiments, the microbial contaminant can comprise one or more microorganisms that are naturally present in the raw materials and brewhouse vessels used during fermentation, also known as "primary contaminants." Non-limiting examples of yeast organisms that can present are wild yeast, as well as yeast from the genera *Brettanomyces* and *Saccharomyces*, in particular, *Saccharomyces cerevisiae* (also known as "Brewer's yeast") and *Saccharomyces uvarum*. Similarly, several bacterial strains can be present, including those that are capable of increasing the acidity of the brewed product. Non-limiting examples of such strains include bacteria from the genera *Lactobacillus*, *Pediobacter*, and *Acetobacter*.

In various embodiments, the microbial contaminant can comprise one or more microorganisms that may be inadvertently introduced into FB intermediates and/or drinkable FB products after fermentation, particularly during canning, bottling, or kegging. Such contaminants, also known as "secondary contaminants" can also cause spoiling of the drinkable FB, even if sterile practices are used upstream of the contamination.

In various embodiments, the dose of UV light applied to the FB can be any value. In some embodiments, the dose of UV light applied is in the range of at least $$10 \frac{\mu J}{cm^2},$$

and up to $$500,000 \frac{\mu J}{cm^2},$$

or more.

In various embodiments, the FB can be treated with UV light for any desired time, based in part on factors including but not limited to the dose, desired log-kill, type of FB, opacity of the FB, and/or the equipment used. In some embodiments, a portion of the FB can be illuminated with UV light for at least 1 second, and up to at least 60 seconds or more.

In various embodiments, the UV light can be emitted as monochromatic or polychromatic light. In some embodiments, the emitted UV light contains at least one wavelength in the UV-C range (~200 nm to ~280 nm), for example, between 250 and 260 nm, particularly 254 nm. In some embodiments, the UV light contains one or more wavelengths in the vacuum-UV range (less than 200 nm), particularly 185 nm. In various embodiments, the emitted UV light can be polychromatic light that may potentially include wavelengths in the visible spectrum. As a non-limiting example, a polychromatic light source may have an output between 200 nm and 600 nm.

In various embodiments, the UV-treated FB can be a bright beer. In some embodiments, the bright beer is illuminated with UV light to form a UV-treated bright beer prior to "clarifying," a general term within the brewing industry to describe any process in which solids are removed from a composition, such as from a wort, bright beer, or beer intermediate. In some embodiments, the bright beer is illuminated with UV light after clarifying, to form a UV-treated clarified bright beer. Separation apparatuses and techniques used to form clarified bright beers and other clarified FBs are described in further detail, below.

In various embodiments, a drinkable FB produced by any of the methods and systems described herein is an FMB. In various embodiments, the drinkable FB is a hard seltzer beverage. In various embodiments, the drinkable FB is a spirit. In various embodiments, the drinkable FB is a hard cider beverage. Additional non-limiting examples of drinkable FBs are described below.

In various embodiments, any of the drinkable FBs described herein can be illuminated with UV light immediately prior to bottling, canning, kegging, or otherwise packaging, without any additional or subsequent purification, flavoring, or processing steps. In some embodiments, a drinkable FB can be illuminated with UV light and stored within a supply tank for a period time prior to bottling, canning, kegging, or packaging.

In various embodiments, an intermediate composition formed in the process of producing a drinkable FB. In some embodiments, the intermediate composition is a colorless, flavorless, and/or odorless base alcohol, selected from the group consisting of: a neutral malt base (NMB); gluten-reduced base; or gluten-free base (GFB); grain-neutral spirits bases (GNS), which are distilled to ABV levels beyond those attainable by yeast alone, typically greater than 90-95% ABV; and wine bases, which are formed from atypical portions of fruits that are fermented, including but not limited to orange peels or grape skins.

In various embodiments, any of the above base alcohols can be utilized to form drinkable flavored FBs, non-limiting examples of which are FMBs and hard seltzer beverages. In some embodiments, methods for forming a refined FB can further comprise the step of adding one or more supplemental ingredients to the base alcohol, the one or more supplemental ingredients selected from the group consisting of water, juice, sweeteners, flavorants, diluents, stabilizer, acidulants, pH-adjusting agents, and combinations thereof, with optional subsequent addition, mixing, and purification steps. In some embodiments, the base alcohol is illuminated with UV light prior to the addition of the one or more supplemental ingredients. In some embodiments, the drinkable FB is illuminated with UV light after all of the ingredients have been added. In a non-limiting example, secondary contaminants within a flavored FB can be reduced or eliminated upon performing a finishing step, the finishing step consisting of the following sub-steps: (i) treating the flavored FB with UV light for a time sufficient to cause at least a log-2 kill of the secondary microbial contaminant, thereby forming a UV-treated flavored FB; (ii) dispensing the UV-treated FB into a container, preferably a container selected from the group consisting of a storage tank, keg, bottle, can, and a box; and (iii) sealing the container. In some embodiments, both the base alcohol and the drinkable FB are each independently illuminated with UV light.

In various embodiments, any of the liquid compositions described herein can be illuminated with UV light in a batch or semi-batch format, for example, when the liquid composition is contained within a vat, drum, tank, or similar holding container. In a batch format, the holding container can be either partially or completely filled with a batch of the liquid composition, and the entire batch treated with the UV light. Subsequently, the UV-treated batch can be removed from the holding container, enabling successive batches to be treated.

In various embodiments, any of the liquid compositions described herein can be illuminated with UV light in an in-line format, for example, within piping, tubing, channel, or similar apparatus for transporting a liquid stream from one process, tank, or container to another. In one non-limiting example, and in some embodiments, one or more internal sections of the piping can comprise a UV-light apparatus for illuminating an FB stream. Such internal UV-light apparatuses are well-known in the water treatment industry. One non-limiting example of an internal UV-light apparatus for treating liquids in an in-line format is described in U.S. Pat. No. 8,766,211, herein incorporated by reference in its entirety.

In various embodiments, an FB, particularly a bright beer, can contain an acidic congener that is a byproduct of the fermentation process. The acidic congener can comprise one or more organic acids, non-limiting examples of which are acetic acid, citric acid, lactic acid, propionic acid, butyric acid, caproic acid, valeric acid, isovaleric acid, succinic acid, and combinations thereof. In some embodiments, the acidic congener comprises acetic acid, lactic acid, and optionally, one or more additional organic acids.

In various embodiments, methods for reducing or eliminating a microbial contaminant within an FB can further comprise sub-steps for neutralizing and removing acidic congeners that may also be present. Methods and systems for neutralizing and removing acidic congeners from an FB are described in U.S. Pat. No. 10,745,658, PCT Publication No. 2020/036932, and U.S. patent application Ser. No. 16/927,744, the disclosures of which are hereby incorporated by reference in their entireties. In some embodiments, the step of neutralizing acidic congeners and removing their salts can comprise the following sub-steps: (i) providing an a bright beer comprising the acidic congener; (ii) treating the bright beer, by adding into the bright beer a sufficient amount of an alkaline treating agent to neutralize and convert at least a portion of the acidic congener into a salt of the acidic congener; and (iii) separating at least a portion of the salt of the acidic congener formed in step (ii) from the alkaline-treated bright beer, thereby producing a refined FB having a reduced level of the acidic congener relative to the bright beer provided in step (i). In some embodiments the provided bright beer is clarified to form a clarified FB. In some embodiments, once the refined FB is formed, it can be illuminated with the UV light, forming a UV-treated refined FB.

In various embodiments, the FB can be illuminated with the UV light, forming a UV-treated FB, to which the alkaline treating agent can be added. In some embodiments, the alkaline-treated FB formed in step (ii) above can be illuminated with UV light to form a UV-treated, alkaline-treated FB. In various embodiments, methods for reducing or eliminating a microbial contaminant within an FB can comprise the steps of: (a) providing an FB comprising a microbial contaminant and an acidic congener, the microbial contaminant comprising one or more microorganisms selected from the group consisting of yeast, mold, viruses, bacteria, and combinations thereof; (b) illuminating the FB with UV light for a time sufficient to kill at least a portion of the microbial contaminant within the FB and form a UV-treated FB; (c) treating the UV-treated FB by adding into the UV-treated FB a sufficient amount of an alkaline treating agent to neutralize and convert at least a portion of the acidic congener into a salt of the acidic congener; and (d) separating at least a portion of the salt of the acidic congener from the alkaline-treated, UV-treated FB, to form a UV-treated refined FB.

In various embodiments, any combination of the FB, alkaline-treated FB, and the refined FB can be illuminated with UV light. As a non-limiting example, a method for producing a refined FB can comprise the steps of: (A) providing a bright beer composition comprising: (i) an acidic congener comprising one or more organic acids, the one or more organic acids selected from the group consisting of: acetic acid; citric acid; lactic acid; propionic acid; butyric acid; caproic acid; valeric acid; isovaleric acid; succinic acid; and combinations thereof; and (ii) a microbial contaminant, the microbial contaminant comprising one or more microorganisms selected from the group consisting of yeast, mold, viruses, bacteria, and combinations thereof; (b) neutralizing at least a portion of the acidic congener by adding into the bright beer composition a sufficient amount of an alkaline treating agent to convert at least a portion of the organic acids into salts of the acidic congener; (c) removing at least a portion of the salts of the acidic congener from the alkaline-treated bright beer to form a refined FB, using one or more separation systems selected from the group consisting of: ultrafiltration; nanofiltration; reverse osmosis filtration; adsorption using activated carbon or a sepiolite material; column distillation: vacuum distillation; multi-stage flash distillation; multiple-effect distillation; vapor-compression distillation; ion exchange chromatography, particularly cation exchange chromatography; gravitation; centrifugation; decantation; freeze-thaw systems; solar evaporation systems; and electrodialysis reversal; and (d) treating at least one of the bright beer, alkaline-treated bright beer, or refined FB with ultraviolet (UV) light for a time sufficient to cause at least a 99% (log-2) kill of the microbial contaminant. In some embodiments, each of the FB, alkaline-treated FB, and the refined FB can be illuminated with UV light. In some embodiments, substantially all of the acidic congener can be neutralized when forming the salt of the acidic congener. In some embodiments, substantially all of the salt of the acidic congener can be filtered or otherwise separated from the alkaline-treated FB. In some embodiments, all of the acidic congener can be neutralized and converted to a salt of the acidic congener, and/or the entire salt of the acidic congener can be separated from the alkaline-treated FB. In some embodiments, a refined FB produced by any of the above methods may retain a portion of the acidic congener from the untreated FB. In some embodiments, the refined FB may retain none, or essentially none, of the acidic congener from the untreated FB. In some embodiments, worts formed from a mash containing malted barley can be fermented to form a malted bright beer, in which the refined FB produced therefrom is an NMB.

In various embodiments, the amount of the salts removed from the alkaline-treated FB can be controlled, based on the type and quality of the separation and/or filtration system used. In some embodiments, at least about 10% by weight, and up to at least about 99.9% by weight, of the conjugate base salts are separated from an alkaline-treated FB when forming a refined FB. In some embodiments, the amount of the conjugate base salts removed from an alkaline-treated FB can be any value or range between and inclusive of 10% by weight and 99.9% by weight. In some embodiments, at least about 80% by weight and up to about 99.9% by weight of the salts are removed from an alkaline-treated FB. In some embodiments, at least about 90% by weight and up to about 99% by weight of the salts are removed from an alkaline-treated FB. In some embodiments, at least about 92% by weight and up to about 97% by weight of the salts are removed from an alkaline-treated FB. In some embodiments, about 95% by weight of the salts are removed from an alkaline-treated FB.

In various embodiments, a wort used to brew an FB, including but not limited to a bright beer, can be fermented with minimal gluten or with gluten completely absent. Gluten can be present in hops, as well as some carbohydrate sources used to form the mash. In some embodiments, fermentable carbohydrate sources can be modified to either reduce or remove gluten until the concentration of gluten is in the range of 0 ppm to 20 ppm, and can be utilized to form a gluten-reduced bright beer. In some embodiments, the mash can be prepared in the absence of malted barley and/or other carbohydrate sources containing gluten, non-limiting examples of which are wheat and rye. Such gluten-free carbohydrate sources can be selected from the group consisting of millet, rice, sorghum, corn, and any mixture or combination thereof. In some embodiments, the wort is fermented using only gluten-free carbohydrate sources, and without adding hops to the fermentation mixture, to form a gluten-free bright beer. In various embodiments, a gluten-free or gluten-reduced bright beer can be purified, filtered, and otherwise processed to form a colorless, odorless, and/or flavorless base that can optionally be further processed to form a gluten-free- or gluten-reduced drinkable FB. In some embodiments, a base alcohol formed from a gluten-free bright beer is a GFB.

In various embodiments, the amount of alkaline treating agent added to the FB can be an amount sufficient to diminish the vinegar-like tastes and/or odors resulting from acetic acid in the refined FB. In some embodiments, the amount of alkaline treating agent added to the FB can be an amount sufficient to cause the vinegar-like taste from acetic acid to be substantially imperceptible in the refined FB. According to the present invention, the amount of alkaline treating agent that is added to the FB can be an amount sufficient to cause the vinegar-like odors from acetic acid to be substantially imperceptible in the refined FB. According to the present invention, the amount of alkaline treating agent that is in the refined FB causes the resulting refined FB to be organoleptically pure, i.e., having no perceptible taste or odor.

In various embodiments, any of the colorless, odorless, and/or flavorless base alcohols described above, including but not limited to NMBs, gluten-reduced bases, GFBs, GNSs, and wine bases, can be formed using any of the methods for neutralizing and/or removing acidic congeners from an FB either described herein or disclosed in U.S. Pat. No. 10,745,658, PCT Publication No. 2020/036932, and U.S. patent application Ser. No. 16/927,744. In some embodiments, the method for brewing an FB further comprises the step of removing solids contained within the FB, to form a clarified FB. In some embodiments, one or more of a wort, raw fermentation product, bright beer, clarified FB or bright beer, refined FB or bright beer, base alcohol, or any other intermediate formed during the production of a drinkable FB can be illuminated with UV light for a time sufficient to kill at least a portion of a microbial contaminant within the respective FB composition. In some embodiments, at least a portion of the neutralized acidic congeners, hop acids and/or their respective salts can be optionally retained, without subsequently separating, filtering, or otherwise removing them from the treated FB composition. With respect to acidic congeners in particular and without being limited by a particular theory, it is believed that acidic congeners can only be detected by taste when the acidic congeners are in their acidic form, whereas organic acidic congeners that have been neutralized have a diminished or negligible effect on taste, even if the neutralized organic acidic congeners and/or their salts are still present within the FB.

In particular, and in various embodiments, methods for neutralizing and/or removing acidic congeners from a bright beer can produce a refined FB having reduced or negligible levels of acetic acid, which, if present, may impart vinegar-like flavor and odor notes that are often undesired. In some embodiments, the refined FB is an NMB, gluten-reduced base, GFB, GNS, or wine base. In some embodiments, any vinegar-like flavor notes and/or odors within any of the bases or flavored beverages above may either be substantially imperceptible to someone drinking or smelling the beverage, or not present at all.

In various embodiments, an NMB, gluten-reduced base, GFB, GNS, or wine base formed from the neutralization and removal of acidic congener(s) can comprise the following properties. (a) a pH in the range of 5.5 to 8.5, preferably 5.8 to 6.5; and/or (b) at least 10%, and up to 20%, by volume, ethyl alcohol; and/or (c) a combined concentration of acetic acid and acetate less than 1000 ppm. In some embodiments, a refined FB can have a titratable acidity, relative to acetic acid, of less than about 0.5 grams per liter of the refined FB, preferably less than about 0.25 grams per liter, and a protonated acetic acid concentration of less than about 100 parts per million, preferably less than about 50 parts per million, and more preferably less than 25 parts per million. In some embodiments, the refined FB can have no measurable protonated acetic acid and or titratable acidity relative to acetic acid.

In various embodiments, bright beers formed from fermentations that contain hop materials can additionally comprise hop acids, non-limiting examples of which are humulones (humulone, cohumulone, adhumulone) and lupulones (lupulone, colupulone, adlupulone), as well as their epimers and isomers. In some embodiments, hop acids can be added to a wort for fermentation in a pre-isomerized form that is resistant to UV-catalyzed decomposition into thiols.

In various embodiments, methods for reducing or eliminating a microbial contaminant within an FB composition comprising hop acids can further comprise steps for neutralizing at least a portion of the hop acids within the beer composition into hop acid salts and removing the hop acid salts from the FB composition, prior to illuminating the FB composition with UV light. Without being limited by a particular theory, it is believed that removing hop acids as salts prior to illuminating a beer composition with UV light can either reduce or eliminate the formation of thiols that can be formed in the UV-treatment step. In some embodiments, the step of neutralizing hop acids and removing hop acid salts can comprise the following sub-steps: (i) providing a starting FB comprising one or more hop acids; (ii) treating the starting FB, by adding into the starting FB a sufficient amount of an alkaline treating agent to neutralize and covert at least a portion of the one or more hop acids into hop acid salts; and (iii) separating at least a portion of the hop acid salts formed in step (ii) from the alkaline-treated FB, thereby producing a refined FB having a reduced level of the hop acids relative to the starting FB composition. In some embodiments, the starting FB comprising hop acids is a bright beer. In some embodiments, the starting FB comprising hop acids is an intermediate formed during a process for forming a drinkable FB product, including but not limited to an FMB or hard seltzer beverage.

In various embodiments, a bright beer can comprise both an acidic congener and one or more hop acids. Generally, such hoppy bright beers are produced from fermentation mixtures comprising hops, yeast, and a wort. In some embodiments, the fermentation mixture comprises spent hops. Accordingly, and in some embodiments, an alkaline treating agent can be added to a hoppy bright beer to simultaneously neutralize at least a portion of both the hop acids and the acidic congener and form their respective salts. In some embodiments, methods for reducing or eliminating a microbial contaminant within a hoppy bright beer containing an acidic congener can comprise the following steps: (a) providing a hoppy bright beer comprising an acidic congener and one or more hop acids; (ii) treating the hoppy bright beer, by adding into the hoppy bright beer a sufficient amount of an alkaline treating agent to neutralize and convert at least a portion of the hop acids and/or the acidic congener into one or more salts; and (iii) separating at least a portion of the salts formed in step (ii) from the alkaline-treated hoppy bright beer, thereby producing a refined bright beer having a reduced level of the hop acids and/or acidic congener relative to the hoppy bright beer provided in step (i). In some embodiments, the hoppy bright beer can be illuminated with the UV light, forming a UV-treated hoppy bright beer, to which the alkaline treating agent can be added. In some embodiments, the alkaline-treated hoppy bright beer formed in step (ii) can be illuminated with UV-light to form a UV-treated, alkaline-treated hoppy bright beer, prior to separating the one or more salts to form the refined bright beer. In some embodiments, once the refined bright beer is formed, it can be illuminated with the UV light, forming a UV-treated refined bright beer. In some embodiments, any combination of the bright beer, alkaline-treated bright beer, and the refined bright beer are illuminated with UV light. In some embodiments, each of the bright beer, alkaline-treated bright beer, and the refined bright beer are illuminated with UV light. In some embodiments, substantially all of the acidic congener can be neutralized to form a salt. In some embodiments, substantially all of the hop acids can be neutralized when forming the hop acid salts. In some embodiments, substantially all of the salt of the acidic congener and/or the hop acid salts can be filtered or otherwise separated from the alkaline-treated bright beer. In some embodiments, all of the acidic congener can be neutralized and converted to a salt, and/or the entire quantity of the acidic congener salt can be separated from the alkaline-treated bright beer. In some embodiments, all of the hop acids can be neutralized and converted to hop acid salts, and/or the entire quantity of the hop acid salts can be separated from the alkaline-treated bright beer. In some embodiments, a refined bright beer produced by any of the above methods may retain a portion of the acidic congener or hop acids from the untreated hoppy bright beer. In some embodiments, the refined bright beer may retain none, or essentially none, of the acidic congener or the hop acids from the untreated bright beer.

In various embodiments, when a hoppy bright beer is UV-treated prior to neutralization, any photocatalyzed alpha-acid products, particularly 3-methylbut-2-ene-1-thiol, that are present can be separated from the alkaline-treated bright beer simultaneously with the acidic congener and hop acid salts. In some embodiments, the photocatalyzed alpha-acid products and salts can be separated from the alkaline-treated bright beer using filtration, particularly a filtration technique selected from the group consisting of ultrafiltration, nanofiltration, reverse osmosis filtration, and combinations thereof. In some embodiments, the filtration comprises reverse osmosis filtration. In some embodiments, the filtration comprises nanofiltration and reverse osmosis filtration.

In various embodiments, the alkaline treating agent used to neutralize hop acids or an acidic congener within an FB can comprise any basic compound that is capable of reacting with an acid, including both strong and weak bases. In some embodiments, the alkaline treating agent may be a caustic composition comprising at least one Arrhenius base that increases the concentration of hydroxide ions in a solution with water. Non-limiting examples include alkali (Group I) and alkaline earth (Group II) metal hydroxides such as potassium hydroxide, sodium hydroxide, barium hydroxide, cesium hydroxide, strontium, hydroxide, calcium hydroxide, lithium hydroxide, and rubidium hydroxide. According to the present invention, the alkaline treating agent may comprise up to about 50% by weight sodium hydroxide. According to the present invention, the alkaline treating agent may comprise up to 50% by weight potassium hydroxide.

In various embodiments, the alkaline treating agent may comprise a weak base, in which the base and its conjugate acid are present in an equilibrium with each other. According to the present invention, the alkaline treating agent may comprise up to 50% by weight sodium bicarbonate. In some embodiments, the alkaline treating agent can comprise one or more caustics, one or more weak bases, and/or a combination of one or more caustics and one or more weak bases.

In various embodiments, the amount of alkaline treating agent that may be titrated into an FB can be an amount sufficient to neutralize at least about 10% by weight, and up to at least about 99.9% by weight, of the acidic congener and/or hop acid, including any percent neutralization or range between and inclusive of 10% by weight and 99.9% by weight. In some embodiments, at least about 90/a and up to about 99% of the acidic congener and/or hop acid is neutralized. In some embodiments, enough alkaline treating agent can be titrated into the FB to neutralize all, or substantially all, of the acidic congener and/or hop acid that is present.

In various embodiments, the portion of the acidic congener and/or hop acids that are neutralized can be controlled by the amount of alkaline treating agent added to the FB, particularly a bright beer, to attain a target pH in the alkaline-treated product. In some embodiments, the target pH of a alkaline-treated FB can be at least about 5.0, and up to at least about 8.7, including any pH value or range between and inclusive of 5.0 and 8.7. In some embodiments, the target pH of the alkaline-treated FB is at least about 5.5, and up to about 7.0. In some embodiments, the target pH of the alkaline-treated FB is at least about 5.8, and up to about 6.5. In some embodiments, the target pH of the alkaline-treated FB is at least about 7.0, and up to about 8.7. In some embodiments, the target pH of the alkaline-treated FB is greater than about 8.7.

In various embodiments, the percent of each of the hop acids or organic acids within the acidic congener that are neutralized can be a function of the pKa of each of the constituent acids and the pH of the alkaline-treated FB. For example, within a composition having a pH of 5.75 and containing acetic acid (pKa~4.75), 10% of the acetic acid remains in its acid form, whereas 90% of the acetic acid is in its conjugate base form (acetate). If lactic acid (pKa~3.8) is also present within the composition, then about 1% of the lactic acid remains in its acid form, while about 99% is present as its conjugate base, lactate. Without being limited by a particular theory, it is believed that other weak acids that may be present, including hop acids and organic acids comprised within an acidic congener, non-limiting examples of which are propionic acid, butyric acid, and/or tartaric acid, have a similar equilibrium, based on their respective pKa values and the pH of the composition. Accordingly, in some embodiments, the amount of alkaline treating agent added into the FB can be the amount sufficient to raise the pH enough to cause at least about 10% by weight, and up to at least about 99.9% by weight, of the acids to be present in their conjugate base form in the alkaline-treated FB. In some embodiments, the amount of the acids present in their conjugate base form in the alkaline-treated FB can be any value or range between and inclusive of 10% by weight and 99.9% by weight. In some embodiments, at least about 80% by weight and up to about 99.9% by weight of the acids within the alkaline-treated FB are in their respective conjugate base forms. In some embodiments, at least about 90% by weight and up to about 99% by weight of the acids within the alkaline-treated FB are in their respective conjugate base forms. In some embodiments, at least about 92% by weight and up to about 97% by weight of the acids within the alkaline-treated FB are in their respective conjugate base forms. In some embodiments, about 95% by weight of the acids within the alkaline-treated FB are in their respective conjugate base forms.

In various embodiments, the relative abundance of the hop acid or acidic congener present in its acidic form and the amount present as a conjugate base can be expressed as a ratio. For example, with respect to acetic acid, a composition containing acetic acid at its pKa is 50:50, whereas at pH 5.75, the ratio is 90:10. Consequently, the reduction of the acidic congener content can be targeted toward the neutralization of a single acid, for example, acetic acid. Without being limited by a particular theory, and as described above, other acids that are present in the bright beer simultaneously with acetic acid are also neutralized upon the addition of the alkaline treating agent, even if they aren't quantified. In some embodiments, the relative abundance of the acetate salt compared to acetic acid in the alkaline-treated FB can be in a range from at least about 50:50, and up to at least about 99.9:0.1. In some embodiments, the relative abundance of acetate salt to acetic acid within the alkaline-treated FB can be in a range from about 90:10 and up to about 99:1. In some embodiments, all, or substantially all, of the acetic acid within the alkaline-treated FB can be neutralized to an acetate salt. In some embodiments, all, or substantially all, of the acetic acid may be neutralized when the pH of the alkaline-treated FB is raised to at least 8.7.

In various embodiments, any of the methods for reducing the concentration of hop acids or acidic congeners described herein can further include one or more salt removal or separation steps that can be performed on the alkaline-treated FB after neutralization. In some embodiments, the removal step may comprise passing an alkaline-treated FB through a filter to separate and remove the hop acid and/or acidic congener salts. Typically, a suitable filter can include a filter or separate device sufficient for the desalination of sea water. Non-limiting examples of the filtration systems for separation of salts from liquid compositions, including water and FBs include: ultrafiltration, reverse osmosis filtration, and nanofiltration, as described above. In some embodiments, an FB can be filtered prior to neutralization in order to remove other particulates or filterable congeners from the FB. In some embodiments, separating the neutralized salts from an alkaline-treated FB can comprise a separation step in addition to or substituting for filtration, including but not limited to: activated carbon absorption; column distillation; vacuum distillation; multi-stage flash distillation; multiple-effect distillation; vapor-compression distillation; ion exchange chromatography, particularly cation exchange chromatography; gravitation; centrifugation; decantation; freeze-thaw systems; solar evaporation systems; and electrodialysis reversal.

In various embodiments, UV light can be applied to one or more of the components of the fermentation mixture. In some embodiments, the water utilized in the fermentation, or "brew water," can be illuminated with UV light prior to forming the fermentation mixture. In some embodiments, the brew water can be reverse-osmosis purified (RO) water. In some embodiments, RO brew water is illuminated with UV light prior to forming the fermentation mixture. In some embodiments, the wort is formed from a mash with no hop materials.

In various embodiments, a method for brewing a bright beer can comprise the following steps: (a) providing a wort having a microbial contaminant, the wort comprising one or more sugars or starches extracted from a fermentable carbohydrate source, the fermentable carbohydrate source selected from the group consisting of millet, rice, sorghum, corn, barley, wheat, rye, and any combination thereof; (b) treating the wort with UV light for a time sufficient to kill at least a portion of the microbial contaminant within the wort, forming a UV-treated wort; (c) adding yeast into the UV-sterilized wort to form a fermentation composition; and (d) fermenting the starches and sugars within the fermentation composition into ethyl alcohol, thereby forming a bright beer. In some embodiments, the provided wort further comprises hop acids extracted from a hop plant. In some embodiments, the step of fermenting the starches and sugars within the fermentation composition further comprises the sub-step of steeping spent hops. In some embodiments, the method for brewing an FB further comprises the step of adding one or more fermentable sugars to the wort, the fermentable sugars selected from the group consisting of dextrose, sucrose, corn syrup, and combinations thereof. In some embodiments, the fermentable carbohydrate source is a malt extract and the fermentable sugar is dextrose. In some embodiments, the malt extract comprises any value less than 5% by weight of the combined weight of malt extract and dextrose (i.e., less than a 1:20 ratio of malt extract to dextrose). In some embodiments, the malt extract comprises any value less than 0.5% by weight of the combination of malt extract and dextrose (i.e., less than a 1:200 ratio of malt extract to dextrose). In some embodiments, the malt extract comprises less than 0.1% by weight of the combined weight of malt extract and dextrose (i.e., less than a 1:1000 ratio of malt extract to dextrose).

In various embodiments, the bright beer is formed from the fermentation of a wort comprising no carbohydrates extracted from a fermentable carbohydrate source, such as from a malt extract. In some embodiments, such methods for brewing a bright beer can comprise the following steps: (a) providing a wort having a microbial contaminant, the wort comprising one or more fermentable sugars selected from the group consisting of dextrose, sucrose, corn syrup, and combinations thereof; (b) treating the wort with UV light for a time sufficient to kill at least a portion of the microbial contaminant within the wort, forming a UV-treated wort; (c) adding yeast into the UV-sterilized wort to form a fermentation composition; and (d) fermenting some or substantially all of the fermentable sugars into ethyl alcohol, thereby forming a bright beer, wherein the wort contains no carbohydrates extracted from a fermentable carbohydrate source, the fermentable carbohydrate source selected from the group consisting of millet, rice, sorghum, corn, barley, wheat, rye, and any combination thereof. In some embodiments, the one or more fermentable sugars is dextrose. In some embodiments, neutral base alcohols produced from fermentable sugars only are called sugar-brew bases.

In various embodiments, the step of providing a wort in either of the above methods can further comprise the substeps of: (i) boiling the wort in the presence of hops for a time sufficient to cause extraction of isomerized hop acids from the hops into the wort; (ii) cooling the wort to below boiling, particularly to a fermentation temperature; and (iii) embodiments removing the hops from the wort to produce a liquid, hopped wort. In some embodiments, the wort can be boiled for at least 2 minutes, up to at least two hours. The fermentation temperature can be any temperature at which fermentation of starches and sugars to alcohol in the wort by yeast can take place. It is well within the ability of those skilled in the art to select a fermentation temperature based on the identity and characteristics of yeast utilized for fermentation and/or the type of FB being produced. In a further embodiment, the bright beer resulting from the fermentation of the hopped wort can be treated to remove any photocatalyzed alpha-acid products, particularly 3-methylbut-2-ene-1-thiol, by adding into the bright beer a sufficient amount of an alkaline treating agent to neutralize and covert at least a portion of the one or more hop acids into hop acid salts; and separating at least a portion of the hop acid salts from the alkaline-treated bright beer, thereby producing a refined bright beer. In some embodiments, the separation step is performed using a nanofiltration and/or reverse osmosis filtration system.

In various embodiments, an in-line UV-treatment system used for killing a microbial contaminant within an FB can comprise: (a) a piping system for transporting an FB stream; (b) one or more UV-treatment apparatuses configured to illuminate the FB stream with UV light; (c) a flow or time delay mechanism; and (d) a controller, for example a central programmable logic controller, in electronic communication with the flow or time delay mechanism for adjusting the flow rate of the FB stream through each of the UV-treatment apparatuses.

In various embodiments, each of the UV-treatment apparatuses can be configured to treat any FB product selected from the group consisting of: starting materials, including but not limited to brew water, worts; bright beers, clarified bright beers; alkaline-treated bright beers; refined FBs, including but not limited to the base alcohols, NMB, gluten-reduced base, GFB, GNS, or wine base, as well as any FMB or drinkable FB product produced therefrom. In some embodiments, the in-line UV-treatment system can comprise a UV-treatment apparatus for illuminating a wort with UV light, and a UV-treatment apparatus for illumining a refined FB, FMB, and/or other drinkable FB with UV light prior to canning, bottling, or kegging.

In various embodiments, the in-line UV-treatment system can be coupled with an in-line caustic dosing system for neutralizing and removing acidic congeners from an FB stream. In some embodiments, an in-line neutralization can comprise: (a) a piping system for transporting an FB stream; (b) one or more pH meters for detecting the pH of an FB stream, or one or more pH meters for detecting the pH of a treated FB stream, or both; (c) an alkalinity container for housing an alkaline treating agent; (d) a metering means for introducing a controlled amount of the alkaline treating agent into the FB stream; and (e) a controller, for example a central programmable logic controller, in communication with the one or more pH meter and the metering means. The metering means can be a metering pump or a liquid flow controller. In some embodiments, the in-line, caustic dosing system further comprises a mixing means for homogenizing the alkaline treating agent into the FB stream. The mixing means can comprise an in-line mixer, a retention piping, and in-line mixing vessel, or a recirculation system. In some embodiments, the in-line, caustic dosing system may further comprise a conductivity meter for detecting the electrical conductivity of the FB stream, the treated FB stream, or both.

In various embodiments, an FB, a non-limiting example of which is a bright beer, which contains an acidic congener, can be neutralized within an in-line neutralization system, comprising an in-line caustic dosing system and at least one separation apparatus, according to the following steps: (1) introducing the FB stream comprising an acidic congener into the in-line caustic dosing system; (2) detecting the pH of the FB stream using a pH meter; (3) determining a neutralizing quantity of the alkaline treating agent sufficient to neutralize some, most or all of the acidic congener, using the controller; (4) dispensing the neutralizing quantity of the alkaline treating agent from the alkalinity container into the FB stream, forming a treated FB stream, to form some, most or all of the acidic congener into a salt, and (5) separating at least a portion of the salt of the acidic congener from the FB stream. In some embodiments, the in-line caustic dosing system can comprise a pH meter for detecting the pH of the FB stream at a position downstream of where the alkaline treating agent is introduced and mixed into the FB stream or for detecting the pH of the treated FB stream, or both. The detected pH of the treated bright beer stream may be used by the controller to determine the sufficient neutralizing quantity of alkaline treating agent. In various embodiments, the pH of the treated bright beer stream is selected or determined by the pKa values of the one or more acidic congeners within the FB stream. In some embodiments, the at least one separation apparatus can further comprise one or more filtration or removal systems, as described above. In some embodiments, the in-line caustic dosing system can comprise a nanofiltration and/or reverse osmosis filtration system.

In various embodiments, within an in-line caustic dosing or UV-treatment system, the quantity of the FB stream can have a mass or volumetric flow rate, and the neutralizing quantity of an alkaline treating agent may have a mass or volumetric flow rate. In some embodiments, the mass or volumetric flow rate of the FB stream or the alkaline treating agent can be substantially constant. In some embodiments, the mass or volumetric flow rate of the FB stream or alkaline treating agent can be detected and adjusted based on factors including, but not limited to: the detected pH of the FB stream, the present mass or volumetric flow rate of the FB stream, and/or the desired dose of UV light to be subjected to a mass or unit volume of the FB stream.

These and other embodiments of the present invention will be apparent to one of ordinary skill in the art from the following detailed description.

DETAILED DESCRIPTION OF THE INVENTION

Definitions

Figure 1:
FIG. 1 shows a flowchart that illustrates the general process for brewing beer.

As used herein, the term, "and/or" when used in the context of a listing of entities, means the entities being present singly or in combination. Thus, for example, the phrase "A, B, C, and/or D" includes A, B, C, and D individually, but also includes any and all combinations and sub-combinations of A, B, C, and D.

As used herein, the term, "bright beer," (also, "young beer" or "green beer") means the unmodified, ethyl alcohol-containing, liquid product of fermentation, after yeast has been decanted, filtered, or otherwise removed.

The term, "alkaline-treated bright beer," refers to the solution of bright beer after neutralizing or treatment with an alkaline treating agent to form a salt of an acidic congener, but wherein the salt has not been separated from the solution. The term, "UV-treated bright beer" refers to a solution of bright beer or alkaline-treated bright beer that has been illuminated with UV light.

As used herein, the term, "caustic" means a compound that dissociates completely to yield hydroxide ions upon interacting with water to form a solution that has a strongly basic pH. Such compounds include, but are not limited to, Group I and Group II hydroxides such as potassium hydroxide, sodium hydroxide, barium hydroxide, cesium hydroxide, strontium, hydroxide, calcium hydroxide, lithium hydroxide, and rubidium hydroxide.

As used herein, the term, "clarified," with respect to a "clarified fermented beverage," can refer to the general term within the brewing industry that describes any process in which solids are removed from a wort, beer, or other fermented beverage. According to the present invention, clarification of a fermented beverage, or of a refined fermented beverage, can be achieved using any mechanical, chemical, or physical separation technique. Non-limiting examples include: ultrafiltration; reverse osmosis filtration; nanofiltration; granular activated carbon separation; column distillation; vacuum distillation; multi-stage flash distillation; multiple-effect distillation; vapor-compression distillation; ion exchange chromatography, particularly cation exchange chromatography; gravitation; centrifugation; decantation; freeze-thaw systems; solar evaporation systems; and electrodialysis reversal.

As used herein, the term "congener," is a substance, other than the desired type of alcohol, ethanol, produced during fermentation and can be present within a fermented beverage in small amounts. Examples of conventional congeners are chemicals such as methanol, acetone, acetaldehyde, esters, tannins, aldehydes and other organic compounds.

As used herein, the phrase "acidic congener" means an organic acid, examples of which can be acetic acid, lactic acid, propionic acid, tartaric acid, and butyric acid, that can have an effect on the taste or smell of the fermented beverage. The phrase "acidic congener" can refer to all of the acids or organic acids present in a fermented beverage, or it can refer to a subset of the acids or organic acids that are present, down to a single acid or organic acids.

As used herein, the term, "fermented beverage" (FB) means a liquid beverage solution that is the product of fermentation from any fermentable sugar source, typically after any yeast has been removed, whether it contains ethyl alcohol or it does not. FBs can include, but are not limited to, acidophiline, agkud, aleberry, amasi, aleberry, amazake, apo, ara, bahalina, bais, basi, beer, bignay wine, bikkle, bionade, blaand, boj, boza, brottrunk, Calpis, cauim, chhaang, Chibuku Shake Shake, chicha, cider, coyol wine, doogh, duhat wine, fassbrause, ginger beer, gouqi jiu, handia, hardaliye, huangjiu, ibwatu, intus, jabol, jun, kabarwaran, kasiri, kefir, kilju, kinutil, kombucha, kumis, kvass, kwete, lambanog, lassi, mageu, malt beverages, malt drink, matzoon, mauby, mbege, merisa, neera, nihamanchi, oshikundu, palek, palm wine, pangasii, parakaria, perry, podpiwek, pruno, pulque, purl, rejvelac, rice wine, ryazhenka, şalgam, sikye, tapuy, tejuino, tepache, tesguino, thwon, tibicos, tiswin, tongba, tono, tubâ, umqombothi, wine, and žinčica. The term "fermented beverage" also includes FBs that have been distilled to form spirits.

As used herein, the term, "flavored malt beverage" (FMB) means the final malt beverage product that is formed once a neutral malt base has been filtered, treated, and processed in order to produce a consumable beverage product.

As used herein, the term, "gluten-free" means that the beer composition contains substantially no gluten. Gluten-free bases (GFB) can be prepared by fermenting sugars from any fermentable sugar source, including cereal grains, that do not contain gluten. Such gluten-free cereal grains include, but are not limited to: millet, rice, sorghum, buckwheat and/or corn. According to the present invention, GFBs are prepared without malts, particularly malted barley, or hop materials present.

As used herein, the terms, "gluten-reduced" or "gluten-removed" mean that the beer contains less than 20 ppm of gluten. Typically, gluten-reduced and gluten-removed beers are prepared from barley, rye, and other fermentable sugar sources that do contain gluten, but where gluten is removed from the beverage after fermentation is completed. However, gluten-reduced and gluten-removed beverages can be prepared from fermentable sugar sources that contain minimal amounts of gluten that total to less than 20 ppm.

As used herein, the terms, "mash" or "mashing" means the process of converting the starches typically present in malts to lower-order sugar molecules, including monosaccharides, disaccharides, and trisaccharides, that are suitable for fermentation with yeast to produce an ethyl alcohol.

As used herein, the terms, "neutralize" or "neutralizing" means the neutralization of at least a portion of the acids, including organic acids, in a fermented beverage with an alkaline treating agent to form therefrom salts, including organic salts.

As used herein, the terms, "neutral malt base" (NMB) or "malt beverage base" means the ethyl alcohol-containing liquid formed as a result of filtering, treating and/or decolorizing a bright beer or other fermented beverage. According to the present invention, NMBs produced by methods and systems of the present invention are colorless, flavorless, and/or odorless.

As used herein, the term, "organoleptically pure," refers to a neutralized or refined FB in which there is substantially no perceptible taste or smell from organic acidic congeners that were originally present in the FB prior to being neutralized, even if a portion of the organic acidic congeners are still present in their acidic form after neutralization and/or separation.

As used herein, the term, "refined," with respect to a "refined fermented beverage," can refer to fermented beverages produced by methods and systems of the present invention in which a portion or all of one or more acidic congeners within a fermented beverage have been neutralized by an alkaline treating agent to form a salt, and a portion or all of the salt is subsequently removed from the neutralized fermented beverage to produce the refined fermented beverage. According to the present invention, a refined fermented beverage can be prepared from a clarified fermented beverage that has been clarified with respect to solids within a wort, beer, or other fermented beverage, but where a portion or all of the acidic congener naturally produced during fermentation have not been removed. According to the present invention, a refined fermented beverage may be prepared from a fermented beverage in which only solids have been removed, or from a fermentation product that has not previously been clarified. According to the present invention, a fermented beverage may be clarified and refined simultaneously, so long as the separation technique or apparatus removes, in addition to the salts, solids that would typically be removed during clarification. According to the present invention, a treated bright beer may be refined to form a refined beer, without also forming a clarified beer, and the refined beer can later be clarified to form a clarified beer.

As used herein, the term, "titratable acidity," is a measurement of the total mass of titratable acids in a solution, typically expressed as grams per liter. The total mass of titratable acids includes both hydronium ions and weak acids that are still protonated, such as acetic acid ($CH_3COOH$). In the brewing industry, titratable acidity is often used to quantify the organic acids present in a given FB, GFB, gluten-reduced or gluten-removed FB, NMB, FMB, potable spirit, or other neutralized product, in order to evaluate the perceivable acidity within the beverage.

As used herein, the terms, "wort" or "wort extract" means the sugar-rich solution or mixture resulting from the mashing and/or cooking process that is suitable for fermentation with yeast to produce ethyl alcohol.

Fermentation Processes to Produce Disinfected or Sterilized Beer

The present invention provides methods and systems for treating, disinfecting, or sterilizing fermented beverage (FB) solutions, including but not limited to the raw fermentation products (bright beer); commercial and/or drinkable fermented beverages, including but not limited to flavored malt beverages (FMB) and hard seltzers; and/or intermediates formed in the course of preparing such drinkable FB products. Upon treating an FB composition containing isomerized hop acids with UV light, the resulting thiols can impart a skunky, "light struck" taste to the beer, which can be separated from the UV-treated FB. The result is an FB product that is disinfected, and in some embodiments sterilized, of microbial contaminants that can arise from fermentation directly and/or are introduced from the equipment, components, and processes, utilized to produce a commercial and/or drinkable FB.

Traditional methods of forming fermentation products used in the production of a neutral malt base (NMB) are widely known in the art and particularly described in detail in U.S. Pat. Nos. 4,440,795, 5,294,450, 5,618,572, and 7,008,652, as well as U.S. Patent Publication 2014/0127354, the disclosures of which are incorporated by reference in their entireties. Those skilled in the art would appreciate that although the fermentation product itself can be called a "beer" or "bright beer", these are general terms to describe a fermentation product and not necessarily the drinkable FB commercially sold as beer.

A flowchart of a generalized beermaking process is illustrated in FIG. 1. The process is also described in detail in De Keukeleire (2000) *Quimica Nova* 23(1):108-112, the disclosure of which is incorporated by reference in its entirety. Generally, to produce a beer, a supply of malt must first be obtained. The malt may be of any conventional type known in the art which is suitable for producing beer and other brewed beverages. One non-limiting example of a suitable malt is "Brewers Malt," available from Briess Malt & Ingredients Co. The malt is then combined with deionized water and heated at high temperature to produce a mash. At this stage, the mash will contain various malt-derived fermentable sugars (e.g. including but not limited to maltose and maltotriose), which are fermentable by yeast into ethyl alcohol, as well as several malt-derived non-fermentable sugars (e.g. including but not limited to maltotetraose and maltopentaose) that cannot be broken down into ethyl alcohol by yeast.

After the mash product has been generated, solids are often removed therefrom, using any apparatus or process known in the brewing art for filtering or decanting mash products. The liquid filtrate can also be modified by any one of several processes known in the art for generating a sugar-rich fermentation composition, which is colloquially known as the wort or wort extract. Such processes include, but are not limited to, adding enzymes that are capable of breaking down the starches, sequentially heating the mash to catalyze chemical conversion of the starches into sugars, and supplementing with additional fermentable sugars (e.g. dextrose, sucrose, and/or corn syrup) and/or "hop materials," which can encompass a wide variety of different products, including but not limited to hop cones, pre-isomerized pelletized hops, and/or solvent-extracted concentrated hop extract. Although the hops typically are only a minor fraction of the wort compared to the substantial quantities of malt that are present, hop materials can be a qualitatively major ingredient with several impacts on the beermaking process and the final, drinkable beer product. Such impacts include, but are not limited to, formation of insoluble complexes with proteins and polypeptides, enhancing the colloidal stability of the beer, sterilization against bacterial contaminants, and contribution of bitter taste. On the other hand, hop acids that are present within the hop materials can be transformed into thiols that cause lightstruck flavors and odors in the beer product.

Yeast can then be added to the wort to initiate fermentation, which is allowed to continue until there are no fermentable sugars remain. Typically, the fermentation process can last for 7-11 days, but the fermentation time is ultimately dependent on numerous factors, including but not limited to temperature. Warmer temperatures typically result in faster fermentation, although excessive heat can create several issues and is often avoided. After fermentation is completed, the yeast from the alcohol-containing fermentation product is allowed to settle out of the product and removed by conventional decantation, centrifugation, and/or filtering techniques, forming an undrinkable bright beer.

Bright beer typically has a pH of about 4.0+/−0.25, based on the identity and total concentration of the organic acids that are present, and is usually colored, fragrant, and contains smaller precipitates that were not removed from the raw fermentation product. Non-hop acid compounds that cause the offending tastes and odors in the bright beer, such as diacetyl and pentane-2,3-dione, are typically allowed to decompose during a maturation period, usually ranging from a couple days to several weeks, until the compounds reach parts-per-billion (ppb) concentration ranges or lower. Additionally, the bright beer can be physically processed to remove other impurities that do not decompose over time. Beer and other fermented beverage (FB) produced for commercial sale can also be flash pasteurized to sterilize the product immediately prior to packaging.

Figure 2:
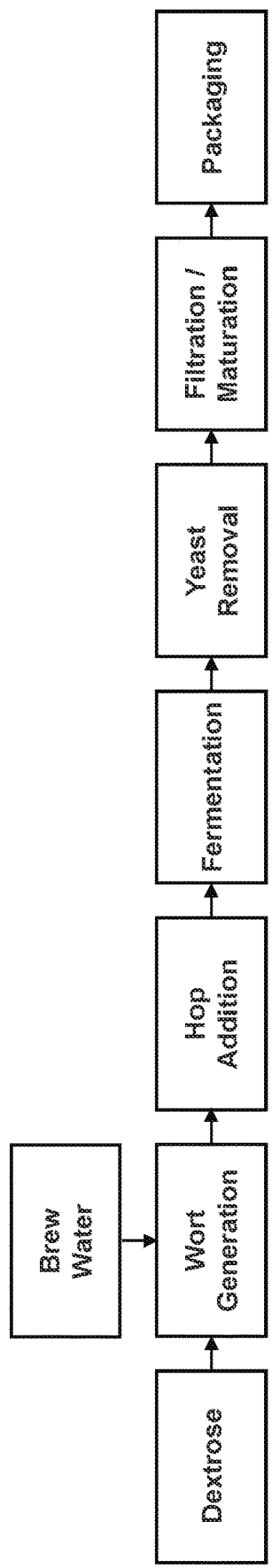
FIG. 2 shows a flowchart that illustrates a general process for brewing beer without a mashing step.

Alternatively, a wort can be generated without mashing, by combining a solution comprising a readily-fermentable simple sugar, such as dextrose, with brew water, as illustrated in FIG. 2. The wort can be pasteurized and combined with malt extract, yeast, and other optional components, such as hops, to initiate fermentation. The fermented products can then be filtered, matured, and packaged similar to the process illustrated in FIG. 1, above.

Hops and Hop Acids

Figure 3:
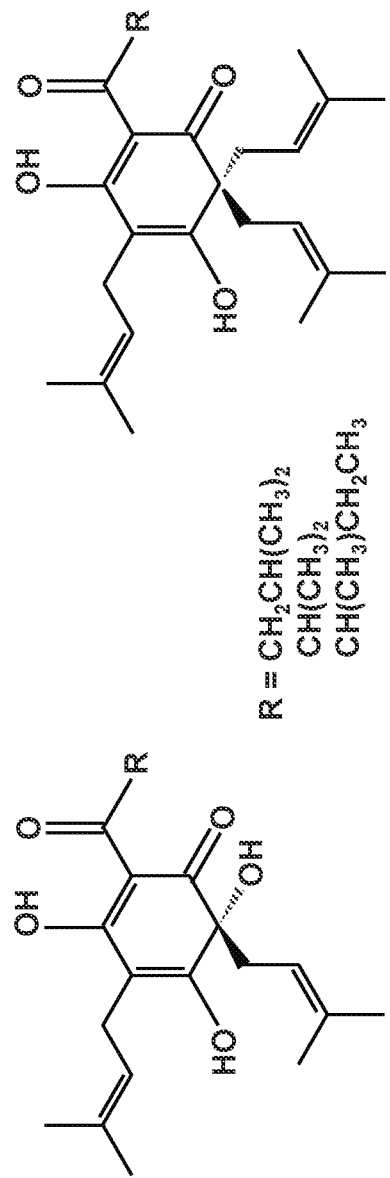
FIG. 3 shows the chemical structures of alpha-acids, beta-acids, and their constituents.

The tastes of FBs that are brewed in the presence of hop materials can be derived in part from the sensory impressions of several different volatile and non-volatile compounds. Within the hop materials, volatile compounds are generally contained in the hop oil (0.5-3% in hops), and non-volatiles, present in the hop polyphenolic fraction (3-6%), contribute to a full mouthfeel during tasting, see De Keukeleire, above. During the conventional boiling or flash pasteurization of a wort containing hops, many constituents are volatilized or oxidized, forming several hop-derived constituents that are to a large extent different from the original compounds present in hops. In particular, hop acids, such as alpha-acids (humulones) and beta-acids (lupulones) are some of the most important contributors to a bitter sensory profile. Both alpha-acids and beta-acids each contain three constituents, differing based on the nature of the side chains derived from the hydrophobic amino acids, leucine, valine, and isoleucine. These constituents are illustrated in FIG. 3. Both of the alpha- and beta-acids and their constituents occur as pale-yellowish solids in the pure state, have poor solubility in water, and have almost no bitter taste. Further, in their native forms, the hop acids strongly inhibit the growth of gram-positive bacteria, although not bacteria that produce lactic acid, acetic acid, and other organic acids.

However, both alpha- and beta-acids are sensitive to modification, particularly reaction products of alpha- and beta-acids formed by oxidation reactions and/or photocatalysis, that do possess unpleasant organoleptic characteristics, even if they protect the FB itself from oxidation. Alpha-acids are particularly prone to thermal isomerization into iso-humulones during the process of wart boiling, as shown in the reaction scheme in FIG. 4. Each humulone gives rise to two epimeric humulones: cis-isohumulones and trans-isohumulones, resulting in six major iso-alpha-acids (cis-isohumulone and trans-isohumulone, cis-isocohumulone and trans-isocohumulone, cis-isoadhumulone and trans-isoadhumulone). All of the iso-humulones are intensely bitter, and are typically present in commercially available beers in a range from about 15 ppm to about 100 ppm, although the bitterness from iso-humulones can be modified with residual sugars to give a "pleasant bitterness" taste.

Figure 4:
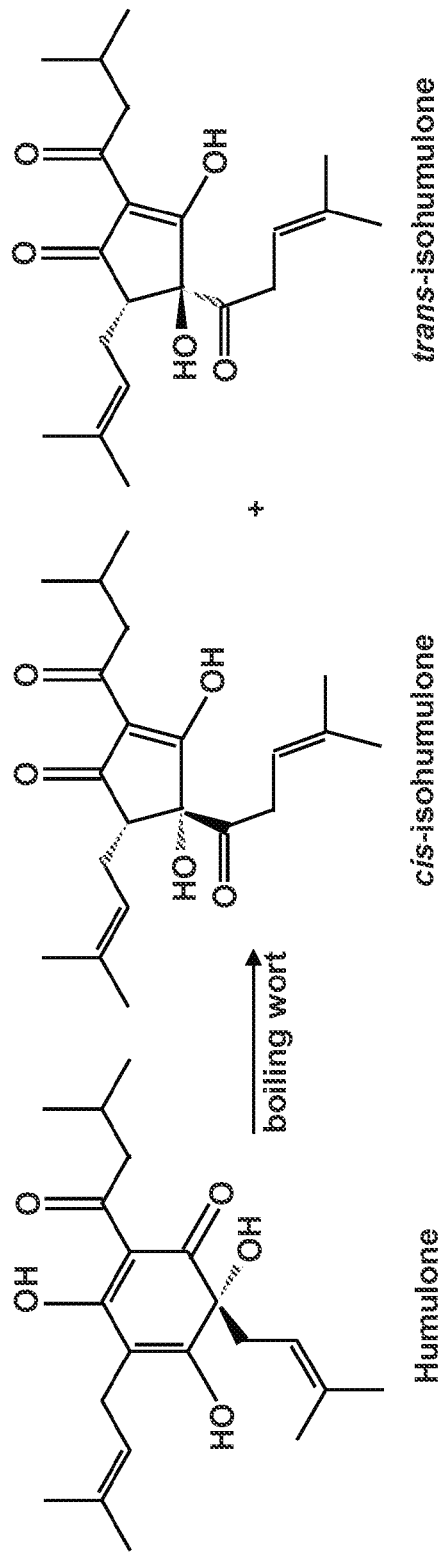
FIG. 4 shows a reaction scheme illustrating the conversion of humulones to iso-humulones upon boiling a wort containing hop acids.
Figure 5:
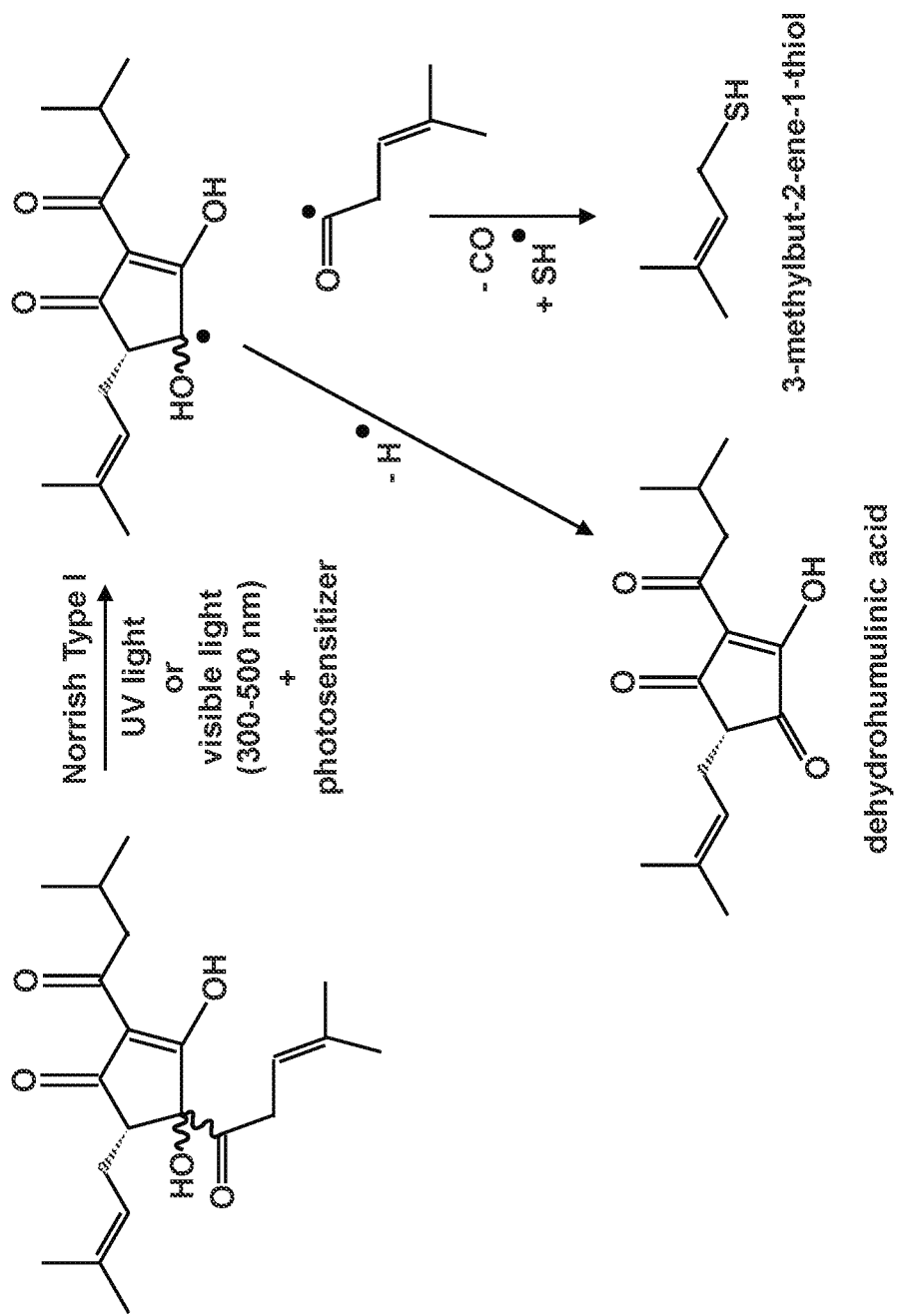
FIG. 5 shows a reaction scheme illustrating the production of 3-methylbut-2-ene-1-thiol as a result of the decomposition of iso-humulones in the presence of UV light.

It is widely known throughout the brewing industry that iso-alpha acids are sensitive to decomposition in the presence of UV light, which leads to the formation of "lightstruck" flavors. Iso-alpha-acids have an acyloin group, comprised by a tertiary alcohol at C(4) and the carbonyl group of the amino acid side chain, also at C(4), as illustrated in FIG. 4. Activation of iso-humulones with UV light causes bond cleavage by a Norrish Type I reaction, leading to a ketyl-acyl radical pair. Subsequent loss of carbon monoxide from the acyl radical and recombination of the resulting fragment result with a thiol radical can form the compound, 3-methylbut-2-ene-1-thiol, also known as 'skunky thiol', together with dehydrohumulinic acid, which itself is a harmful degradation product (see U.S. Pat. No. 5,073,396, the disclosure of which is herein incorporated by reference in its entirety. The reaction scheme to produce 3-methylbut-2-ene-1-thiol is illustrated in FIG. 5. The flavor threshold is so low that concentrations of only a couple parts per billion (ppb) irreversibly spoil the FB quality.

Consequently, compositions comprising alpha-acids generally cannot be disinfected or sterilized using UV light without causing the formation of skunky thiols. Non-limiting examples of such compositions that can contain alpha-acids are worts, wort extracts, bright beers, neutral base alcohols, and drinkable FB products, including but not limited to FMBs and hard seltzer beverages. The compositions can instead be disinfected or sterilized by boiling or flash pasteurization, but applying heat by either process can cause conversion of humulones into isohumulones, leaving the FB susceptible to skunking upon exposure to UV light.

Beta-acids, in contrast to alpha-acids, cannot form iso-acids because they do not contain an aromatic tertiary alcohol, so are therefore not susceptible to photocatalysis to form thiols. However, beta-acids are sensitive to aerobic oxidation reactions, which can cause an increased and potentially unwanted bitter flavor over time. Such degradation products include, but are not limited to: hydroxytricyclolupulone (both epimers), dehydrotricyclolupulone (both epimers), hydroperoxytricyclolupulone (both epimers), and nortricyclolupulone (see, e.g. Mikyška, A., et al., *Acta Horticulturae* (2013) 1010:221-230 and Krofta, K., et al., *Kvasny Prum* 59:306-312, the disclosures of which are herein incorporated by reference in their entireties).

Treatment of Fermentation Products with UV Light

In one embodiment, the present invention provides methods for treating, disinfecting, and/or sterilizing FB compositions by illuminating them with ultraviolet (UV) light, the FB compositions including but not limited to bright beer, FB intermediates, base alcohols, FMBs and other drinkable FBs, and for removing flavor notes and odors formed from hop acids that give the composition a light struck and skunky organoleptic experience. In other embodiments, when hop acids are present within an FB composition, the hop acids can be neutralized and removed from the FB composition prior to illuminating the FB composition with UV light.

Thus, in another embodiment, a bright beer can be fermented according to a method in which at least one of the components utilized in the fermentation is UV-treated. In some embodiments, the wort can be illuminated with UV light prior to being added into the fermentation mixture. In some embodiments, the wort is formed from a filtered mash product. In another embodiment, brew water is UV-treated prior to being combined with dextrose and malt extract. In some embodiments, the wort contains no hop materials, particularly hop acids, at the time the wort is illuminated with UV light. In other embodiments, the wort contains hop materials, particularly hop acids, and more particularly humulones, at the time the wort is illuminated with UV light. In further embodiments, the hop acids are separated from the UV-treated wort. In other further embodiments, the hop acids are separated from a bright beer after fermentation is complete.

Figure 6A:
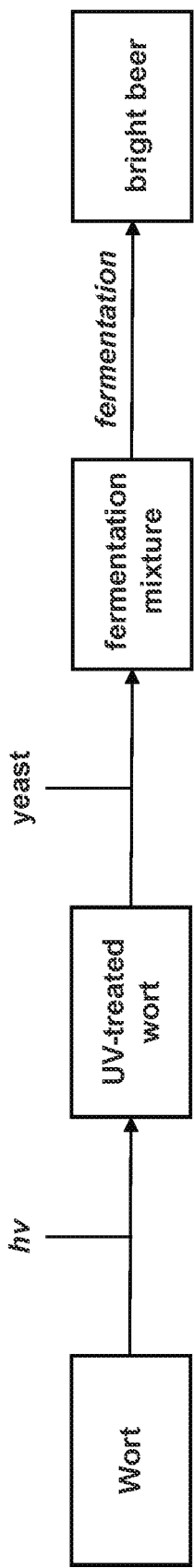
FIG. 6A shows a flowchart that illustrates an exemplary method for illuminating a wort with UV light to treat, disinfect, or sterilize the wort prior to fermentation.

In one non-limiting example, UV light can be utilized to treat, disinfect, or sterilize a wort used in a fermentation to produce a bright beer that is subsequently processed to form a neutral base alcohol. Such methods, as illustrated in FIG. 6A, can comprise the steps of: (a) providing a wort, the wort formed from a mash comprising one or more fermentable carbohydrates (starches and sugars) extracted from a fermentable carbohydrate source, the fermentable carbohydrate source selected from the group consisting of millet, rice, sorghum, corn, barley, wheat, rye, and any combination thereof, (b) treating the wort with ultraviolet (UV) light, shown in FIG. 6A as hv, for a time sufficient to kill at least a portion of the microbial contaminant within the wort or wort extract, forming a UV-treated wort, (c) adding yeast into the UV-treated wort to form a fermentation composition; and (d) fermenting substantially all of the fermentable carbohydrates (starches and sugars) within the fermentation composition into ethyl alcohol, thereby forming a fermentation product. In some embodiments, hops can optionally be added to the UV-treated wort, prior to initiating fermentation upon adding yeast.

Figure 6B:
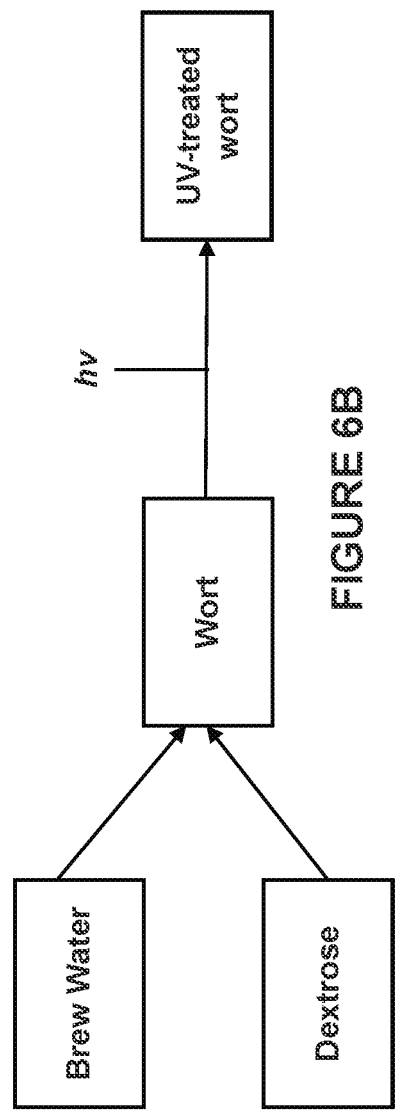
FIG. 6B shows a flowchart that illustrates an exemplary method for illuminating a dextrose/water wort with UV light to treat, disinfect, or sterilize the wort prior to fermentation.

In another non-limiting example, the wort can be formed from a solution of sugar, preferably dextrose, and water, preferably deionized or reverse-osmosis purified water, as illustrated in FIG. 6B. Optionally, the water itself can be illuminated and treated with UV light prior to combining with the dextrose. In some embodiments, worts formed from dextrose and water can be utilized to form gluten-free bases utilized in the production of a flavored drinkable FB, including as a non-limiting example, a hard seltzer beverage. In some embodiments, the dextrose/water wort can be combined with yeast to form a fermentation mixture, similar to the process shown in FIG. 6A. In some embodiments, the dextrose/water wort can be combined with malt extract, and optionally hops, along with the yeast when forming a fermentation mixture. In some embodiments, the malt extract is a millet malt extract.

In another embodiment, UV light can be utilized to treat, disinfect, or sterilize a flavored malt beverage, hard seltzer, or other product formed from a neutral base alcohol, particularly products that don't have any hop materials. A neutral base alcohol, particularly a neutral malt base, can be formed according to the processes of any of the processes are described U.S. Pat. Nos. 4,440,795, 5,294,450, 5,618,572, and 7,008,652, as well as U.S. Patent Publication 2014/0127354, incorporated by reference in their entireties above.

UV light can be applied to any of the starting material and/or FB compositions herein using a fluid radiation treatment system, which is well-known in the food and water treatment industries. Several patents and patent publications that describe such fluid radiation treatment systems include U.S. Pat. Nos. 4,317,041; 4,482,809; 4,872,980; 5,006,244; 5,418,370; 5,539,210; 5,846,437; 5,866,910; 5,994,705; 6,015,229; 6,916,452; 7,166,850; 7,390,225; 7,695,675; 7,985,956; 8,167,654; and 8,766,211, the disclosures of which are incorporated by reference in their entireties.

Generally, UV light is applied to a sample to affect a target "kill" of the microbial population, resulting in the treatment, disinfection, or sterilization of the particular surface, composition, or sample. In various embodiments, at least about 90% of the microbial contaminant is inactivated. Inactivating 90% of the microbial contaminant is equivalent to a log−1 reduction of the microbial population within the beer. In some embodiments, the beer is illuminated with UV light for a time sufficient to disinfect at least about a log−2 (99%) portion of the microbial contaminant within the beer, for example, at least log−3 (99.9%), log−4 (99.99%), log−5 (99.999%), or log−6 (99.9999%). In some embodiments, treatment with the UV light affects at least a log−3 kill (disinfection) of microorganisms within the composition. In some embodiments, treatment with the UV light affects at least a log−5 kill (sterilization) of the microorganisms within the sample.

The quantity of the microbial application within an aqueous, and in some instances alcohol-containing, composition that is inactivated is dependent on multiple factors, including but not limited to the wavelength(s), dose, and time that the light is applied, the transmissibility of the transmission, and the initial level of contamination.

In some embodiments, the UV light can be illuminated in one or more wavelengths. Lamps for emitting either monochromatic or polychromatic UV light are well-known in the art. In some embodiments, the emitted UV light contains at least one light wave having a wavelength in the UV-C range (~200 nm to ~280 nm), for example, between 250 and 260 nm. In particular, UV light at the 254 nm wavelength can penetrate microbial cell walls or envelopes, causing irreversible dimerization of thymine based within the microorganisms' DNA, preventing microbial reproduction.

In some embodiments, the UV light contains one or more light waves having a wavelength in the vacuum-UV range (less than 200 nm), particularly 185 nm, where organic carbon sources that are used as nutrients by the microorganisms can be oxidized by hydroxyl radicals. In some embodiments, the UV light contains light waves in the UV-C range, particularly 254 nm, and in the vacuum-UV range, particularly 185 nm.

In some embodiments, the starting material or FB composition containing the microbial contaminant can be illuminated with polychromatic light. A non-limiting example of the wavelengths illuminated from a polychromatic light source can include a range of 200 nm to 600 nm, even though some of the light is in the visible spectrum. Polychromatic UV light can be emitted with significantly more UV energy than monochromatic UV light and can be utilized in compact treatment systems capable of treating high flow rates of material. In some embodiments, the polychromatic UV light contains light waves having at least one wavelength in the range of at least 250 nm and up to 260 nm, particularly 254 nm.

The UV dose received by a fluid element is defined as the product of UV intensity and exposure time. The accumulated UV dose received by a fluid element exiting the device is the sum of the individual doses received at each position. Since the UV intensity is attenuated with the distance from the UV source, it is desirable to mix fluid elements from regions far from the UV source to regions of higher intensity nearer to the source, thereby ensuring they receive an adequate dose of UV radiation.

Without being limited by a particular theory, the magnitude of the microbial disinfection can be proportional to the dose of UV light applied to the liquid composition. Generally, the dose of the applied UV light is defined as the product of the intensity of the UV light and the residence time, and can be expressed in terms of microjoules per square centimeter $$\left(\frac{\mu J}{cm^2}\right),$$

or equivalently, microwatt seconds per square centimeter $$\left(\frac{\mu W \cdot s}{cm^2}\right).$$

In various embodiments, the dose of UV light applied can be any value in the range of at least $$10 \ \frac{\mu J}{cm^2},$$

and up to $$500,000 \ \frac{\mu J}{cm^2},$$

or more. Non-limiting examples of such doses are a least 50

$$\frac{\mu J}{cm^2},$$

at least $$100 \ \frac{\mu J}{cm^2},$$

at least $$500 \ \frac{\mu J}{cm^2},$$

at least $$1,000 \ \frac{\mu J}{cm^2},$$

at least $$2,500 \ \frac{\mu J}{cm^2},$$

at least $$5,000 \ \frac{\mu J}{cm^2},$$

at least $$10,000 \ \frac{\mu J}{cm^2},$$

at least $$50,000 \ \frac{\mu J}{cm^2},$$

at least $$100,000 \ \frac{\mu J}{cm^2},$$

or at least $$250,000 \ \frac{\mu J}{cm^2}.$$

The average UV dose, in $$\frac{\mu J}{cm^2},$$

required for inactivation of various pathogens is indicated in Table 1, below.

TABLE 1

| Pathogen | Log-1 | Log-2 | Log-3 | Log-4 |
| --- | --- | --- | --- | --- |
| *Vibrio cholerae* | 800 | 1,400 | 2,200 | 2,900 |
| *Shigella dysenteriae* | 500 | 1,200 | 2,000 | 3,000 |
| *Escherichia coli* 0 157:H7 | 1,500 | 2,800 | 4,100 | 5,600 |

TABLE 1-continued

| Pathogen | Log-1 | Log-2 | Log-3 | Log-4 |
|---|---|---|---|---|
| Salmonella typhi | 1,800-2,700 | 4,100-4,800 | 5,500-6,400 | 7,100-8,200 |
| Shigella sonnei | 3,200 | 4,900 | 6,500 | 8,200 |
| Salmonella enteritidis | 5,000 | 7,000 | 9,000 | 10,000 |
| Hepatitis A virus | 4,100-5,500 | 8,200-13,700 | 12,300-22,000 | 16,400-29,600 |
| Poliovirus Type 1 | 4,100-6,000 | 8,700-14,000 | 14,200-23,000 | 21,500-30,000 |
| Coxsackie B5 virus | 6,900 | 13,700 | 20,600 | 30,000 |
| Rotavirus SA 11 | 7,100-9,100 | 14,800-19,000 | 23,000-25,000 | 36,000 |

Factors that can influence the dose received by the composition can include, but are not limited to, the flow rate, UV-transmittance, turbidity, water hardness (where applicable), and pH of the composition. For example, it is believed that in an in-line system, the dose received by the composition is inversely proportional to the flow rate, i.e. a composition passed through an in-line system at a slower flow rate will receive a higher dose of UV light relative to a composition passed through the system at a faster flow rate.

UV-transmittance is the ratio of light entering the composition relative to the light exiting the composition—commonly reported for a path length of 1 cm and expressed as a percentage (% UVT). For example, deionize or reverse osmosis-purified water is often ~99% UVT, while a composition such as milk may have a 0.0001% UVT. Generally, starting materials, finished beverages, and/or their intermediates illuminated with UV light according to the methods and systems of the present invention will have at least 0.001% UVT, at least 1% UVT, at least 30% UVT, at least 50% UVT, at least 65% UVT, at least 80% UVT, at least 95% UVT, or at least 99% UVT, depending on the composition.

A similar composition property, turbidity (typically reported in Nephelometric Turbidity Units (NTU)), is a measurement of suspended matter in the composition, which can affect microbial kill by shielding pathogens from being contacted by the UV light. Consequently, as a composition becomes more turbid, an effectively larger dose is required to attain a desired microbial kill relative to a composition with a lower turbidity. Generally, starting materials, finished beverages, and/or their intermediates illuminated with UV light according to the methods and systems of the present invention may have a turbidity less than 5 NTU, although compositions that are more turbid can nonetheless be disinfected with UV light. A non-limiting example of a method for UV-disinfection of turbid compositions using aeration is described in U.S. Pat. Pub. No. 2004/0213696, the disclosure of which is incorporated by reference in its entirety. In another non-limiting example, a mixing means such as a retention piping (described in further detail below) can be utilize to blend or homogenize the composition as it is being illuminated with the UV light.

Additionally, solubilized metal ions that are present within the water can also affect the performance of the UV system on microbial kill. For example, iron, calcium, and other metal salts can both directly affect the UVT of the composition and indirectly affect performance by forming residues or films on system components. Similarly, the pH of the composition can affect whether salts and other components that may be present are solubilized or are suspended as solids. The pH of non-limiting exemplary fermentation mixtures, bright beers, processed fermented beverages, and their intermediates are described in further detail below.

In some embodiments, the time sufficient to treat, disinfect, or sterilize at least a portion of the microbial contaminant can be the residence time, such as the non-limiting examples of at least 1 second, at least 5 seconds, at least 10 seconds, at least 15 seconds, at least 20 seconds, at least 30 seconds, or at least 60 seconds.

It is well within the scope of those skilled in the art to be able to select a radiation source and system capable of illuminating a composition having a known or estimated UVT with a selected dose of UV light, for a time sufficient to affect a desired microbial kill. In some embodiments, when the UV-treatment is performed on an FB stream in an in-line UV-treatment system, the system can be configured to meet the list of criteria required to accept water treated with UV light to be considered equivalent to pasteurized water, as enforced in the FDA's 2019 amendment to the Grade "A" Pasteurized Milk Ordinance. Of note, the ordinance requires that the UV-disinfection system is configured to at least: apply UV light so that the entire volume of water receives 254 nm low-pressure UV light at a dose of $$186{,}000 \; \frac{\mu W \cdot s}{cm^2} \; \text{(log-4 adenovirus equivalent)},$$

and medium pressure UV light at $$120{,}000 \; \frac{\mu W \cdot s}{cm^2} \; \text{(log-4 adenovirus equivalent)};$$

a flow or time delay mechanism for adjusting the flow rate of the stream and ensuring that the entire stream is treated with a minimum desired dose of the UV light; an automatic flow control system or valve to restrict flow so that all particles receive the minimum dose; a calibrated UV intensity sensor, filtered to restrict sensitivity to the 250-280 nm germicidal spectrum, with one sensor per UV lamp; light adjustment based on real-time UVT analysis for continuously calculating accurate and reliable dose measurements; and a flow diversion valve or automatic shut-off for preventing disinfected stream from contacting untreated stream, among other materials and recording requirements.

One non-limiting example of a suitable in-line fluid treatment system that can be utilized is described in U.S. Pat. No. 8,766,211, which generally comprises at least one UV radiation source having a radiation emitting surface and at least one nozzle element having a fluid discharge opening spaced from the radiation emitting surface, the fluid discharge opening being configured to impinge fluid to be treated on to at least a portion of the radiation emitting surface. Particularly, a such system can comprise a fluid inlet for receiving a pressurized flow of fluid; a fluid treatment zone in fluid communication with the fluid inlet; at least one elongate UV radiation source disposed in the fluid treatment zone; a plurality of nozzle elements arranged in an annular configuration with respect to the at least one elongate radiation source, each nozzle element having a fluid discharge opening configured to impinge fluid to be treated substantially axially with respect to an axis of the at least one elongate radiation source, the annular configuration of the plurality of nozzle elements being disposed so as to impinge the fluid to be treated substantially axially on to greater than one half of the entire length of a radiation emitting portion of the at least one elongate radiation source; and a fluid outlet for discharging treated fluid. Such systems as the ones described above, and others similarly capable of treating a fluid composition with UV light, are commercially available from Trojan UV Technologies Group ULC and Aquafine™ Corporation, including the Aquafine™ Swift-Beverage Series, Logic Series, OptiVenn Series, and the Avant Series.

In another embodiment, once a composition is treated, disinfected, or sterilized upon being illuminated with UV light, compounds formed from photocatalysis, as well as other impurities, can be removed using any separation or filtration apparatus. A separation apparatus can comprise one or more filters for removing lightstruck flavors, neutralized organic acid salts, other congeners originally present in the untreated FB, and solids including but not limited to small molecules and metal chelates, macromolecules such as proteins and nucleic acids, microorganisms such as bacteria and/or viruses, and particulates. Pore size for the filters can be selected based on the desired properties of the neutral base and/or the final drinkable product, and can range from less than 1000 microns down to less than 1 micron, including less than 0.1 microns. Additionally, one or more filtration systems can be utilized, including but not limited to: coarse, micro-, nano-, and/or ultrafiltration; reverse osmosis filtration; diatomaceous earth filtration; and activated charcoal filtration. In some embodiments, the post-filtration or separation apparatus can comprise a reverse osmosis filtration apparatus. Other separation apparatuses can include ion exchange chromatography, particularly cation exchange chromatography; gravitation; centrifugation; distillation apparatuses configured for column distillation, vacuum distillation, multi-stage flash distillation, multiple-effect distillation, and vapor-compression distillation; and/or decantation. Separation apparatuses such as these are described in further detail, below.

Figure 7:
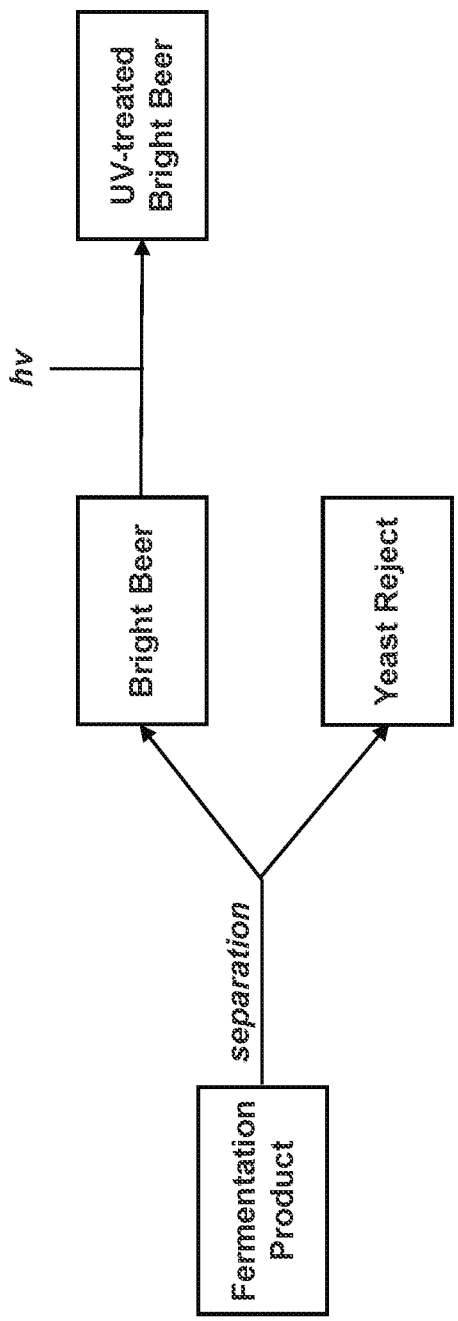
FIG. 7 shows a flowchart that illustrates an exemplary method for illuminating a bright beer with UV light to treat, disinfect, or sterilize the bright beer prior to being further processed to form a drinkable fermented beverage.

In another embodiment, UV light can be utilized to treat, disinfect, or sterilize a bright beer. Such methods, as illustrated in FIG. 7, can comprise the steps of: (a) providing a fermentation product comprising an alcohol-containing liquid portion and a yeast-containing particulate portion; (b) separating and retaining the alcohol-containing liquid portion from the particulate portion, for example, by decantation or centrifugation, to form a bright beer; and (c) treating the bright beer with UV light for a time sufficient to reduce, disinfect, or sterilize the microbial contaminant within the bright beer, forming a UV-treated bright beer. In some embodiments, photocatalytic products can be removed from the UV-treated bright beer using any of the separation or filtration apparatuses described above. In some embodiments, the wort utilized in the generation of fermentation product comprises malts derived from malted barley, and the bright beer is processed further to generate a neutral malt base. In some embodiments, the wort is formed from fermentable carbohydrates derived from gluten-free sources, selected from the group consisting of millet, rice, sorghum, corn, and any mixture or combination thereof, and the resulting bright beer is processed further to generate a gluten-free base. Neutral malt bases and gluten-free bases, and methods for forming them, are described in further detail below.

Alkaline Treatment of Fermented Beverages

In another embodiment, UV-treatment can be coupled with methods and systems for removing acidic congeners that can negatively impact a person's organoleptic experience when drinking flavored malt beverages (FMBs), hard seltzer beverages, and other fermented beverages prepared from a base alcohol. Such acids can interfere with the intended flavors, and in the case of acetic acid, can impart their own sour flavors and odors.

Acids are often naturally present in fermented beverages from the malting and mashing of grains. During the mashing process, precipitated phosphate and proteins from the malts can form insoluble calcium salts, which have been strongly correlated with a decrease in mash pH. Additionally, several malt varieties contain high levels of lactate (See South, J. B. "Variation in pH and Lactate Levels in Malts" (1996) *J. Inst. Brew.* 102:155-159, the disclosure of which is incorporated by reference in its entirety), acetate, butyrate, propionate that ultimately are transferred to the mash. For instance, South determined that the concentration of lactate in several varieties of malts ranged from 17.6 to 126.3 milligrams per 100 grams of malt (dry weight). The lactate concentration is inversely proportional to the pH of the wort, ranging from 5.59 at the highest lactate concentration to 6.02 at the lowest lactate concentration. Without being limited by a particular theory, it is believed that much of the increase in the acetate, butyrate, propionate, and lactate content is derived from the numerous bacteria that can be present in the mash product, including but not limited to bacteria from the genera *Lactobacillus*, Pediobacter, and *Acetobacter*.

Methods and systems for neutralizing and removing acidic congeners from a beer composition are described in U.S. Pat. No. 10,745,658, PCT Publication No. 2020/036932, and U.S. patent application Ser. No. 16/927,744, cited above. Such methods can be utilized to produce a colorless, odorless, and flavorless base alcohol, to which flavor additives can be intermixed to form FMBs, hard seltzers, and other drinkable flavored fermented beverages. Generally, processes for producing a refined FB, particularly a neutral base alcohol, from an FB solution comprising one or more organic acidic congeners, can comprise the steps of: (a) neutralizing one or more organic acidic congeners contained in the FB solution by titrating or adding into the FB an amount of an alkaline treating agent sufficient to convert at least a portion of the one or more organic acidic congeners into its conjugate base to form an organic salt, and (b) removing the organic salt from the alkaline-treated FB solution, thereby producing a refined FB. In some embodiments, the FB solution is a clarified or un-clarified bright beer.

Figure 8:
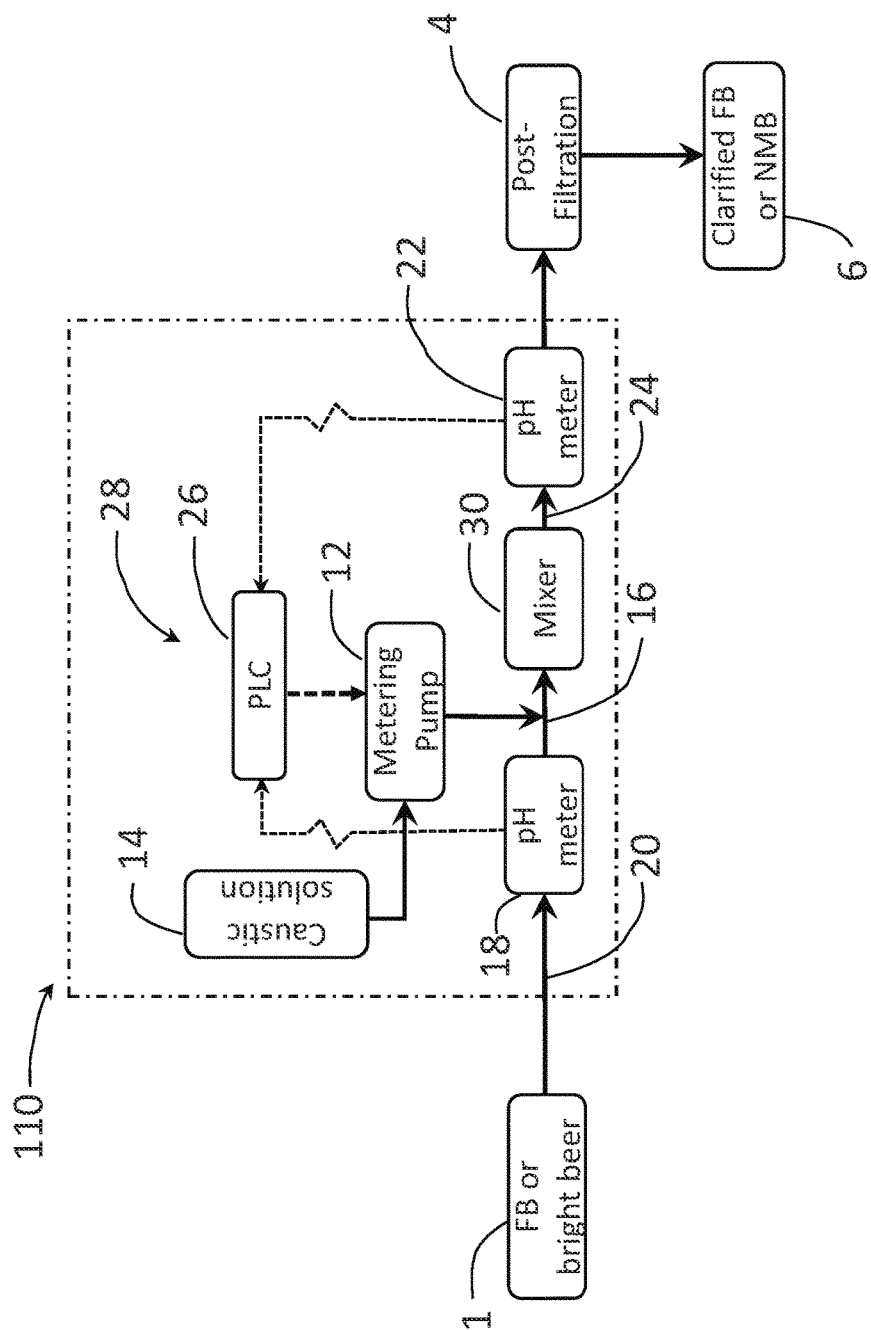
FIG. 8 shows a schematic diagram of a caustic dosing system and process for neutralizing organic acids in an FB solution, using an in-line continuous neutralizing system, employing a caustic solution metering pump.

One non-limiting example of a system for neutralizing and removing acidic congeners from FBs is an in-line caustic dosing system, as illustrated in FIG. 8. The in-line caustic dosing system 110 processes a FB stream 1 into an outflow of a refined FB 6. The FB stream 1 passes to the in-line caustic dosing system 110, and after pH treatment of the FB stream 1 in the in-line caustic dosing system 110, the resulting neutralized bright beer 24 is processed by post-neutralization separation 4 to remove or filter the salt forms of the organic acids, to produce the refined FB 6.

The in-line caustic dosing system 110 includes a metering means, illustrated as a metering pump 12, for metering a quantity of a caustic solution from a container 14 into a junction of the piping system 16 disposed between two pH meters, including a first pH meter 18 that detects the pH of the beer stream entering 20 the in-line caustic dosing system 110, and a second pH meter 22 that detects the pH of the treated FB stream 24 after the addition of a caustic stock solution, for example, 50% (w/v) sodium hydroxide or 50% (w/v) potassium hydroxide. The two pH meters 18 and 22 and metering pump 12 are in data signal transfer and control communication with a programmable logic controller (PLC) 26 to form a communication and control loop 28 that detects pH of the FB streams, determines an amount of caustic stock solution sufficient to neutralize acidic congeners in the FB composition, and controls the quantity and/or rate of caustic stock solution added to the FB stream that is sufficient to neutralize the FB stream to a target pH range sufficient to neutralize the organic acidic congeners within beer stream 20.

The flow rate of the FB stream 20 is determined by the processing conditions upstream for making the FB composition 1. While the volumetric flow rate is typically constant, some variation can be expected. In an embodiment of the invention, an upstream flow of the FB composition 1 can be captured into a holding container, and pumped at a more constant volumetric rate from the container to the in-line caustic dosing system 110. The holding container, would have sufficient volume to allow for fluctuations of the FB composition flowing in, while maintaining, or regulating, the flow rate of the FB composition 20 to the in-line caustic dosing system 110. Alternatively, the sufficient quantity of caustic stock solution can be controlled using a flow control valve that regulates the solution under pressure from a pressure pump.

Typically, the pH of an FB composition entering the caustic dosing system is less than about 6.0. In some embodiments, the pH of the composition is less than about 5.0, or less than about 4.0, or less than about 3.0. However, the composition's pH can vary according to the identity and concentration of the acidic congeners within. For instance, the $pK_a$ values of acetic acid, lactic acid, propionic acid, and butyric acid are 4.75, 3.86, 4.87, and 4.82, respectively. As reported by Smith, (see "Variation in pH and Lactate Levels in Malts," above) the concentration of lactate in various malt varieties ranged from 17.6 to 126.3 milligrams per 100 grams of malt. Based on the pH of the FB composition entering the caustic dosing system determined at the pH meter 18, the PLC 26 determines the amount of caustic solution to add into the stream by metering pump 12 to raise the pH to within the target pH range to neutralize the organic acidic congeners.

In some embodiments, the sufficient amount of alkaline treating agent is sufficient to raise the pH of the FB composition to at least about 5.0, including at least about 5.5, 5.8, 5.9, 6.0, 6.1, 6.2, 6.3, 6.5, 6.8, 7.0, 7.5, 7.8, 8.0, 8.2, or 8.5, including at least about 8.7. In some embodiments, the sufficient amount of alkaline treating agent is sufficient to raise the pH of the FB composition to less than about 8.7, including less than about 8.5, 8.2, 8.0, 7.8, 7.5, 7.0, 6.8, 6.5, 6.4, 6.3, 6.2, 6.1, 6.0, 5.9, 5.8, or 5.5, down to less than about 5.0. In some embodiments, the sufficient amount of alkaline treating agent is sufficient to raise the pH of the FB composition to a pH range from about 5.5 up to about 5.8, or 5.9, or 6.0, or 6.1, or 6.2, or 6.3, or 6.5, or 6.8, or 7.0, or 7.5, or 7.8, or 8.0, or 8.2, or 8.5. In some embodiments, the sufficient amount of alkaline treating agent is sufficient to raise the pH of the FB composition to a pH range from about 5.8 up to about 5.9, or 6.0, or 6.1, or 6.2, or 6.3, or 6.5, or 6.8, or 7.0, or 7.5, or 7.8, or 8.0, or 8.2, or 8.5. In some embodiments, the sufficient amount of alkaline treating agent is sufficient to raise the pH of the FB composition to a pH range from about 6.0 up to about 6.1, or 6.2, or 6.3, or 6.5, or 6.8, or 7.0, or 7.5, or 7.8, or 8.0, or 8.2, or 8.5. In some embodiments, the target pH of the treated or neutralized FB composition is from about 6.5 up to about 6.8, or 7.0, or 7.5, or 7.8, or 8.0, or 8.2, or 8.5. In some embodiments, the sufficient amount of alkaline treating agent is sufficient to raise the pH of the FB composition to a pH range between and inclusive of any two pH values listed above between and inclusive of 5.0 and 8.5.

The alkaline treating agent can include one or more basic compounds, including both strong and weak bases, that are capable of reacting with and neutralizing organic acids. Suitable strong bases can include, but are not limited to, a caustic solution comprising at least one Arrhenius base that increases the concentration of hydroxide ions in a solution with water, such as the alkali (Group I) and alkaline earth (Group II) metal hydroxides potassium hydroxide, sodium hydroxide, barium hydroxide, cesium hydroxide, strontium hydroxide, calcium hydroxide, lithium hydroxide, and rubidium hydroxide. Stock solutions of the caustic solution can be any concentration, but in some embodiments, the concentration is sufficiently high to safely add a minimal amount of the caustic solution to neutralize acidic congeners within the bright beer without substantially affecting its volume. In some embodiments, the caustic stock solution comprises up to a 50% (v/v) solution of sodium hydroxide. In some embodiments, the caustic stock solution comprises up to a 50% (v/v) solution of potassium hydroxide.

Upon reacting with any one of the metal hydroxides listed above, the at least one organic acidic congener is converted to a salt and water, according to net ionic equation in Equation 1, below.

$$HA(aq) + OH^-(aq) \rightarrow A^-(aq) + H_2O(l) \quad (1)$$

In a non-limiting example, when the organic acidic congener is acetic acid, the neutralization reaction proceeds according to Equation 2, shown below.

$$CH_3COOH(aq) + OH^-(aq) \rightarrow CH_3COO^-(aq) + H_2O(l) \quad (2)$$

In other embodiments, the alkaline treating agent can comprise a weak base. Generally, a weak base does not dissociate completely in water and can exist in equilibrium with its conjugate acid. As with the strong bases, enough of a weak base can be added to neutralize a portion of the acidic congeners within the FB composition. In some embodiments, enough weak base is added to completely neutralize all of the acidic congeners that are present within the FB composition. Suitable weak bases can include, but are not limited to, sodium acetate, sodium bicarbonate, and ammonium hydroxide. In some embodiments, the alkaline treating agent comprises ammonium hydroxide. As a non-limiting example, the equation of the neutralization reaction between acetic acid and ammonium hydroxide is shown below in Equation 3.

$$CH_3COOH(aq) + NH_4OH(aq) \leftarrow CH_3COONH_4(aq) + H_2O(l) \quad (3)$$

However, in any reaction between a weak acid and a weak base, the resulting net ionic equation results in the production of water, according to Equation 4, below.

$$H^+(aq) + OH^-(aq) \leftarrow H_2O(l) \quad (4)$$

In another embodiment, the neutralization of the at least one acidic congener can be accomplished by titrating into the FB composition a sufficient amount of the alkaline treating agent to transform at least a portion of the organic acidic congeners within the FB composition into organic salts, or filterable forms thereof. In some embodiments, all, or substantially all, of the organic acidic congeners within the FB composition are neutralized into organic salts or filterable forms thereof, which can be accomplished by raising the pH enough to reach or surpass the equivalence point of each of the organic acidic congeners within the FB composition and convert them into their respective conjugate bases. When a weak acid is titrated with a strong base, such as NaOH, the equivalence point occurs above a pH of 7. As a non-limiting example, the $pK_a$ of acetic acid is 4.75, and the pH at the equivalence point, in which all, or substantially all, of the acetic acid has been converted to acetate, is typically around 8.7 to 8.8. Increasing the pH of the FB composition with a strong base beyond the equivalence point simply adds additional hydroxide ions to the solution, without measurably affecting the concentration of acetic acid.

Accordingly, and in some embodiments, the neutralization of the at least one acidic congener can be accomplished by titrating into the FB composition a sufficient amount of the alkaline treating agent to transform at least a portion of the organic acids within the FB composition into organic salts, or filterable forms thereof. In some embodiments, the amount of alkaline treating agent added to the FB composition is the amount sufficient to neutralize at least about 10 percent by weight of the organic acidic congeners within the FB composition, which can be at least about 25 percent (%), or at least 50%, or at least 60%, or at least 70%, or at least 75%, or at least 80%, or at least 85%, or at least 90%, or at least 95%, or at least 96%, or at least 97%, or at least 98%, or at least 99%, or at least 99.5%, or at least about 99.9 percent by weight of the organic acidic congeners within the FB composition. In some embodiments, less than about 99.9 percent by weight of the organic acidic congeners within the FB composition are neutralized, including less than about 99.5, 99, 98, 97, 96, 95, 90, 85, 80, 75, 70, 60, 50, or 25 percent, down to less than 10 percent by weight.

In some embodiments, the neutralization of a single organic acid can be quantified, including the acetic acid, lactic acid, propionic acid, tartaric acid and butyric acid congeners listed above. In some embodiments, the single organic acid congener that is quantified is acetic acid. Upon addition of an alkaline treating agent to the FB composition, acetic acid is subsequently converted to an acetate salt. At the $pK_a$ of acetic acid, which is about 4.75, the ratio of acetate to acetic acid within a solution is 50:50. As the pH of the solution is increased, the relative abundance of the acetate salt compared to acetic acid is also increased, so at one pH unit above the $pK_a$, 5.75, the ratio of acetate to acetic acid is 90:10, at two pH units above the $pK_a$, the ratio of acetate to acetic acid is 99:1, and so on. Thus, in some embodiments, the amount of alkaline treating agent added to an FB composition can be an amount sufficient to raise the relative abundance of the acetate salt compared to acetic acid to be at least about 50:50, including at least about 60:40, 70:30, 75:25, 80:10, 85:15, 90:10, 95:5, 96:4, 97:3, 98:2, 99:1, or 99.5:0.5, up to at least about 99.9:0.1. In some embodiments, the relative abundance of acetate salt to acetic acid within the treated FB composition is about 90:10 to about 99:1, or about 92:8 to about 98:2, or about 95:5. In some embodiments, all, or substantially all, of the acetic acid within the FB composition is neutralized to an acetate salt. In some embodiments, all, or substantially all, of the acetic acid is neutralized when the pH of the FB composition is raised to at least 8.7.

The in-line caustic dosing system 110 can also include a mixing means for mixing the FB stream and the caustic solution into a homogenous pH-treated solution having a pH that has been adjusted into the target pH range. The mixing means ensures homogeneity of the pH-treated FB composition and improves the neutralization control and outcome. One embodiment of a mixing means is an in-line mixer 30, such as a static in-line mixer, as shown in FIG. 3. In another embodiment, a mixing means can comprise a retention piping to increase the amount of time that the caustic solution is in contact with the stream of bright beer. The retention piping can comprise a length of flow piping 31, which can include one or a plurality of elbows or turns in piping, the length of the flow piping and/or the one or plurality of elbows being sufficient to homogenize the pH-treated FB composition.

The second pH meter 22, located on the outflow side of mixing means, discussed below, provides feedback control by communicating to the PLC 26 of the pH of the pH-treated FB composition after caustic solution is injected or added. In an embodiment of the invention, after the FB composition has passed through the in-line caustic dosing system 110, the neutralized or treated FB composition has a pH sufficient to neutralize the organic acid congeners. The PLC 26 can be configured to increase or decrease the amount or rate of caustic solution injected by the in-line caustic dosing system 110 until the pH of the neutralized (treated) FB composition is within the target pH range.

In another embodiment, an in-line caustic dosing system can comprise a conductivity meter utilized as a replacement for a supplement to one of the one or more pH meters. In general, conductivity meters measure the electrical conductivity within a solution by measuring the quantity of ionized species within the solution. Measuring conductivity is often useful for inline acid-base titrations at constant temperature because conductivity can be measured quickly and the conductivity is often comparable from one production run to another.

For example, in acid-base titrations in which a strong base is titrated into a solution of one or more weak acids, the addition of the strong base changes the conductivity of the weak acid solution. At first, the addition of NaOH creates a buffer solution in which the H+ concentration within the solution is only slowly reduced, and the conductivity falls slightly. The decrease in conductivity is counteracted as more base is introduced to the solution and more Na+ is produced along with the conjugate base of the weak acid, increasing the conductivity of the solution. After all of the acid has been neutralized and the equivalence point has been reached, adding further NaOH typically increases the conductivity of the system sharply, as OH– ions begin to accumulate and pre-dominate the ionic species within the solution.

Salts of the acidic congener can be separated and removed from an FB composition using any of the separation apparatuses described above at post-neutralization separation 4. In some embodiments, the one or more separation apparatuses can comprise one or more filtration systems, including but not limited to: coarse, micro-, nano-, and/or ultrafiltration: reverse osmosis filtration; diatomaceous earth filtration; and activated charcoal filtration. In some embodiments, the one or more separation systems are selected from the group consisting of nanofiltration, reverse osmosis filtration, and activated carbon filtration, including combinations thereof. In some embodiments, reverse osmosis filtration is utilized, in part, to remove salts of the acidic congener.

In another embodiment, the post-filtration or separation apparatus 4 can comprise one or more distillation apparatuses that can be utilized in a process to make a refined spirit, in which fractions containing ethanol are separated from aqueous fractions containing the neutralized organic acid salts, as well as other minor chemical constituents, that are produced or were present during the mashing process. Distillation apparatuses can include, but are not limited to: column distillation, vacuum distillation, multi-stage flash distillation, multiple-effect distillation, and vapor-compression distillation apparatuses.

In another embodiment, filtration and distillation apparatuses can be utilized in combination or wholly separate from one another. For example, and in one embodiment, a refined FB composition can be produced by filtering out the organic acid congeners, without using distillation. In some embodiments, a refined spirit can be produced by distilling out the alcohol from a neutralized FB composition containing the organic acidic congeners in salt form, without using filtration. In some embodiments, a refined spirit can be produced by first filtering out the salt forms of the organic acidic congeners from the treated FB composition, and then subsequently distilling the filtrate to produce the refined spirit.

Alternatively, a refined spirit having reduced or negligible levels of organic acidic congeners can be produced by distilling the ethanol from a neutralized FB composition containing the organic salts of the acidic congener, without utilizing a filtration apparatus. In other embodiments, a portion of the organic salt can be filtered from the neutralized FB composition, prior to the distillation step. In some embodiments, a refined spirit can be produced from a beverage that has already been distilled, though still contains a measurable level of acidic congeners, particularly organic acids, by: (a) providing a distilled beverage comprising ethanol and at least one organic acidic congener; (b) neutralizing at least a portion of the at least one acidic congener by titrating or adding into the distilled beverage a sufficient amount of an alkaline treating agent to convert the at least one acidic congener into an organic salt to form a neutralized distilled beverage; and (c) separating the organic salt from the neutralized distilled beverage to produce a refined spirit.

After removal or separation of the salt forms of the organic acidic congeners from the pH-treated FB composition, refined FBs with substantially no measurable organic acids can be produced, for example, when a completely flavorless, odorless, and colorless neutral base is desired. Such refined neutral bases can be versatilely used without clashing with any of the flavors introduced in the production of the flavored beverage. However, in some embodiments, a refined FB or neutral base in which some of the organic acids are retained after neutralization can be desired, for instance, when flavors provided by some organic acids may supplement or enhance the odor and/or taste of a resulting FMB, hard seltzer, or other beverage produced from the refined FB. Such refined FBs can have a slightly different and partly lower pH, or partly higher pH, than the pH of the unfiltered and neutralized bright beer, depending on the $pK_a$ of any organic acids remaining in the refined FB.

One way to determine the extent of the neutralization of the organic acids within an FB is to compare the titratable acidity—a calculation of the total mass of hydronium ions ($H_3O^+$) and protonated weak acids in a volume of solution, often expressed as grams per liter or parts per million—of an untreated FB with a treated or refined FB. Titratable acidity is commonly used within the brewing and winemaking industries because pH only describes the amount of $H_3O^+$ ions in a solution. In contrast, humans can perceive acidity from both $H_3O^+$ ions and protonated weak acids. Titratable acidity is determined by calculating how much of a base, usually NaOH, must be added to the beverage in order to raise the pH of the beverage to a pre-determined value, which is typically near the equivalence point of the titration. In the brewing industry, the pre-determined pH value is typically between about 8.0 and 8.5, based on the identity and relative quantity of the organic acids that are present.

Furthermore, the perceived acidity of an FB composition itself can be evaluated using titratable acidity. As the titratable acidity decreases, the perceived acidity also decreases, and can ultimately reach a point where a person cannot perceive the taste and/or smell of acid(s) within the FB. In some embodiments, the titratable acidity of a refined FB is less than about 1 gram per liter (g/L), including less than about 0.75, 0.5, 0.4, 0.3, 0.2, 0.1, or 0.05, down to less than about 0.01 g/L.

Similarly, the concentration of acetic acid can be determined analytically. Non-limiting examples of analytical methods to determine acetic acid concentration include high performance liquid chromatography (HPLC) and enzymatic assays. One such enzymatic assay kit for determining the concentration of acetic acid is the K-ACETRM acetic acid test kit, available from Megazyme®. Under assay conditions, all, or substantially all, of the acetic acid that is present in the sample is converted to acetate. However, if the pH of the FB sample is known, one can determine how much acetic acid is present based on the $pK_a$, as discussed above. For example, if the pH of a FB is 6.35, and the concentration of the acetate in the sample is determined to be 300 ppm, then approximately 4 percent of the acetic acid in the treated FB composition is present in the protonated form, or about 12 ppm.

Thus, in some embodiments, the combined concentration of acetic acid and acetate within a refined FB or neutral base alcohol, after separating and removing salts of the acidic congeners that were formed during neutralization, can be less than about 1000 parts per million by weight (ppm), which can be less than about 900 ppm, or less than about 800 ppm, or less than about 700 ppm, or less than about 600 ppm, or less than about 500 ppm, or less than about 400 ppm, or less than about 300 ppm, or less than about 200 ppm, less than about 100 ppm, or less than about 50 ppm. In some embodiments, the combined concentration of acetic acid and acetate within a refined FB is in a range of about 200 ppm to about 500 ppm. In some embodiments, the combined concentration of acetic acid and acetate within a refined FB is in a range of about 300 ppm to about 400 ppm.

In another embodiment, the concentration of acetic acid in its protonated form within a refined FB or neutral base alcohol, based on its pH, is less than about 500 ppm, including less than about 400, 300, 200, 100, 75, 50, 25, 10, or 5, down to less than about 1 ppm. In some embodiments, the concentration of protonated acetic acid in the refined FB or neutral base alcohol is in a range of about 10 ppm to about 100 ppm, or about 25 ppm to about 75 ppm. In some embodiments, there is substantially no protonated acetic acid within the refined FB or neutral base alcohol. In further embodiments, the neutral base alcohol is an NMB. In further embodiments, the neutral base alcohol is a GFB.

In another embodiment, the refined FB is a neutral base alcohol, for example, an NMB, a GFB, or a gluten-reduced base. In another embodiment, the refined FB is an NMB. In some embodiments, the alcohol content (ABV) of a refined FB is at least about 0.05% ABV, including at least about 0.1, at least about 0.5, at least about 1, at least about 2, at least about 3, at least about 4, at least about 5, at least about 6, at least about 7, at least about 8, at least about 9, at least about 10, at least about 12, at least about 15, at least about 17, at least about 20, at least about 25, at least about 30, at least about 35, at least about 40, at least about 45, at least about 50, at least about 55, at least about 60, and at least about 65% ABV. In other embodiments, the ABV of a refined FB is less than or equal to about 65, including less than or equal to about 60, less than or equal to about 55, less than or equal to about 50, less than or equal to about 45, less than or equal to about 40, less than or equal to about 35, less than or equal to about 30, less than or equal to about 25, less than or equal to about 20, less than or equal to about 15, less than or equal to about 10, less than or equal to about 9, less than or equal to about 8, less than or equal to about 7, less than or equal to about 6, less than or equal to about 5, less than or equal to about 4, less than or equal to about 3, less than or equal to about 2, less than or equal to about 1, less than or equal to about 0.5, less than or equal to about 0.1, and less than or equal to about 0.05% ABV. Useful ranges can be selected from any of the above ABV values between and inclusive of about 0.05% ABV to about 65% ABV, including from about 5 percent to about 20% ABV, from about 10% to 20% ABV, from about 12% to 20% ABV, from about 15% to about 20% ABV, from about 17% to about 20% ABV, from about 10% to about 17% ABV, or from about 12% to about 15% ABV. In some embodiments, the ABV of a refined spirit produced by any of the above neutralization methods or systems is at least about 0.05%, and up to 95%, ABV, including any ABV or range of ABV's between and inclusive of about 0.05% and 95% ABV.

In another embodiment, flavored FBs, non-limiting examples of which are FMBs and hard seltzer beverages, can be formed by adding one or more supplemental ingredients to the base alcohol, non-limiting examples of which can be selected from the group consisting of water, juice, sweeteners, flavorants, diluents, stabilizer, acidulants, pH-adjusting agents, and combinations thereof, with optional subsequent addition, mixing, and purification steps.

In another embodiment, the alcohol content (ABV) of a flavored FB, non-limiting examples of which are FMBs and hard seltzers, is at least about 0.05% ABV, including at least about 0.1, at least about 0.5, at least about 1, at least about 2, at least about 3, at least about 4, at least about 5, at least about 6, at least about 7, at least about 8, at least about 9, at least about 10, at least about 12, at least about 15, at least about 17, and at least about 20% ABV. In other embodiments, the ABV of a flavored FB is less than or equal to about 20, including less than or equal to about 15, less than or equal to about 10, less than or equal to about 9, less than or equal to about 8, less than or equal to about 7, less than or equal to about 6, less than or equal to about 5, less than or equal to about 4, less than or equal to about 3, less than or equal to about 2, less than or equal to about 1, less than or equal to about 0.5, less than or equal to about 0.1, and less than or equal to about 0.05% ABV. Useful ranges can be selected from any of the above ABV values between and inclusive of about 0.05% ABV to about 20% ABV, including from about 5 percent to about 20% ABV, from about 3% to 10% ABV, or from about 4% to 8% ABV.

In another embodiment, flavored FBs in which acidic congeners have been removed can comprise acetic acid in its protonated form at concentrations less than about 500 ppm, including less than about 400, 300, 200, 100, 75, 50, 25, 10, or 5, down to less than about 1 ppm. In some embodiments, the concentration of protonated acetic acid in the flavored FB is in a range of about 5 ppm to about 50 ppm, or about 10 ppm to about 30 ppm.

UV Treatment of Neutralized and Refined FB's

In another embodiment, FBs can be illuminated with UV light to inactivate, disinfect, or sterilize microbial contaminants either prior to, or after, neutralizing with an alkaline treating agent, according to any of the methods described herein. Accordingly, in one non-limiting example, methods for inactivating, disinfecting, or sterilizing a fermented beverage can comprise the following steps: (a) providing an FB comprising a microbial contaminant and an acidic congener; (b) treating the FB with UV light for a time sufficient to inactivate, disinfect, or disinfect the microbial contaminant within the FB, forming a UV-treated FB; (c) adding into the UV-treated bright beer a sufficient amount of an alkaline treating agent to neutralize at least a portion of the acidic congener and forming a salt of the acidic congener within the neutralized, UV-treated FB; and (d) separating at least a portion of the salt of the acidic congener from the neutralized, UV-treated FB to form a refined FB.

In another non-limiting example, methods for inactivating, disinfecting, or sterilizing a fermented beverage can comprise the following steps: (a) providing a FB comprising a microbial contaminant and an acidic congener; (b) adding into the FB a sufficient amount of an alkaline treating agent to neutralize at least a portion of the acidic congener and forming a salt of the acidic congener within the neutralized FB; (c) treating the neutralized FB with UV light for a time sufficient to kill a portion or all of the microbial contaminant within the neutralized FB; and (d) separating at least a portion of the salt of the acidic congener from the neutralized, UV-treated FB to form a refined FB. Alternatively, the separation and UV-treatment steps can be performed in reverse order, such that the salt of the acidic congener is separated from the neutralized FB to form a refined FB, followed by the UV-treatment of the refined FB to form a UV-treated, refined FB.

In any of the above embodiments, the acidic congener comprises acetic acid. In some embodiments, the ratio of acetate salt to acetic acid within a neutralized bright beer is in a range from at least about 50:50, up to about 99:1. In further embodiments, the acidic congener also comprises at least one organic acid selected from the group consisting of lactic acid, tartaric acid, propionic acid, and butyric acid.

In any of the above embodiments, the provided FB is a bright beer comprising hop acids, wherein at least a portion of the hop acids and/or photocatalyzed hop acid products are separated out along with the salt of the acidic congener, using any of the filtration or separation methods described above. In further embodiments, the separation step comprises reverse osmosis filtration.

Without being limited by a particular theory, it is believed that adding the alkaline treating agent prior to illuminating the bright beer with the UV light can also result in the neutralization of hop acids within the bright beer. Although hop acids are very weakly soluble in water and can be present within a composition as a complex equilibrium with several potential resonance structures, apparent pKa values can nonetheless be assigned by measuring the apparent solubility of the hop acid as a function of pH (trans-isohumulone=1.28+/−0.11; humulone=3.88+/−0.25; and colupulone=5.89+/−0.12; see Simpson, W. J., *J. Inst. Brew.* (July-August 1993) 99:317-326, the disclosure of which is herein incorporated by reference in its entirety). In particular, isohumulone and humulone, alpha-acids that can either directly or indirectly catalyzed to form dehydrohumulinic acid and 3-methylbut-2-ene-1-thiol, have apparent pKa values that are either lower or similar to the pKa values of organic acids within the acidic congener. As a result, these hop acids can be converted into their conjugate base salts, along with the salts of the acidic congener, and can be filtered or separated out from the neutralized bright beer using any of the separation methods described above. Similarly, it is also believed that un-neutralized hop acids and/or photocatalytic hop acid products have a larger surface area than organic salts, such as sodium acetate, and can be separated out alongside the salts of the acidic congener when forming a refined FB.

In another embodiment, enough alkaline treating agent can be added to a bright beer comprising hop acids to neutralize at least a portion of the beta-acids within the bright beer. In some embodiments, enough alkaline treating agent can be added to raise the pH of the bright beer to at least 6.0, or 6.1, or 6.2, or 6.3, or 6.4, or 6.5, or 6.6, or 6.7, or 6.8, or 6.9, or 7.0, or 7.5, or 8.0, or 8.5, or 8.7, and convert at least a portion of the beta-acids that are present into their conjugate base salts. In some embodiments, enough alkaline treating agent can be added to raise the pH of the bright beer to convert at least 50%, or 55%, or 60%, or 65%, or 70%, or 75%, or 80%, or 85%, or 90%, or 95%, or 99%, or 100% by weight of the beta-acids into their conjugate base salts.

Additionally, and in another embodiment, hop acids, salts of the hop acids, and photocatalyzed products of hop acids (e.g., dehydrohumulinic acid and 3-methylbut-2-ene-1-thiol) can either be partially or fully removed from a neutralized bright beer in the separation step, particularly when the separation is conducted on the basis of size, such as reverse osmosis filtration. In some embodiments, at least 50%, or 55%, or 60%, or 65%, or 70%, or 75%, or 80%, or 85%, or 90%, or 95%, or 99%, or 100% by weight of the hop acids, salts of the hop acids, and photocatalyzed products of hop acids are removed from the neutralized bright beer in the separation step.

Refined FB's that have also been UV-treated can have any of the properties as described above with respect to pH, ABV, titratable acidity, acetic acid concentration, color, odor, and flavor. Additionally, and in another embodiment, such refined FB's can maintain a reduced quantity of hop acids relative to the bright beer prior to UV-treatment. In some embodiments, the quantity of hop acids contained within the UV-treated product is below 100 ppm, for example, below 100 ppm, 90 ppm, 80 ppm, 70 ppm, 60 ppm, 50 ppm, 40 ppm, 30 ppm, 20 ppm, 15 ppm, 10 ppm, 5 ppm, 1 ppm, 0.5 ppm, or 0.1 ppm. In some embodiments, the UV-treated product contains no measurable hop acids. Similarly, the refined FB can contain minimal, or zero, byproducts from the photocatalysis of hop acids, namely, dehydrohumulinic acid and 3-methylbut-2-ene-1-thiol. In some embodiments, the quantity of dehydrohumulinic acid or 3-methylbut-2-ene-1-thiol contained within the UV-treated product is below 100 ppb, for example, below 100 ppb, 90 ppb, 80 ppb, 70 ppb, 60 ppb, 50 ppb, 40 ppb, 30 ppb, 20 ppb, 15 ppb, 10 ppb, 5 ppb, or 1 ppb. In some embodiments, the UV-treated product contains no measurable dehydrohumulinic acid or 3-methylbut-2-ene-1-thiol.

In another embodiment, any of the refined FBs above can be utilized as a neutral base alcohol, to which one or more ingredients can be added to form a drinkable FB. Non-limiting examples of such commercial drinkable FBs include FMBs and hard seltzer beverages. In some embodiments, the refined FB is an NMB, a gluten-free base, or a gluten-reduced based. In some embodiments, the one or more ingredients can include one or more each of an ingredient selected from the group consisting of: flavorants, juices, acidulants, sweeteners, preservatives, salts, and diluents, including combinations thereof. In some embodiments, the refined FB can be carbonated.

In another embodiment, the drinkable FB can be sterilized immediately prior to into a container, preferably a container selected from the group consisting of a storage tank, keg, bottle, can, and a box. Presently, beer, FMBs, hard seltzers and other drinkable FBs are sterilized by flash pasteurization, an energy intensive process that requires heating the beverage to greater than 70° C. for a time sufficient to achieve a desired microbial kill, followed by a rapid cooling phase, typically to approximately 4° C. However, drinkable FBs produced according to methods of the present invention can be treated with UV light as a substitute for flash pasteurization. Without being limited by a particular theory, it is believed that the separation of components from prior alkaline neutralization and/or UV-treatment steps can facilitate the UV-treatment of drinkable FBs immediately prior to into a container, preferably a container selected from the group consisting of a storage tank, keg, bottle, can, and a box, without having to subject the UV-treated drinkable FB to a subsequent separation or filtration step.

Figure 9:
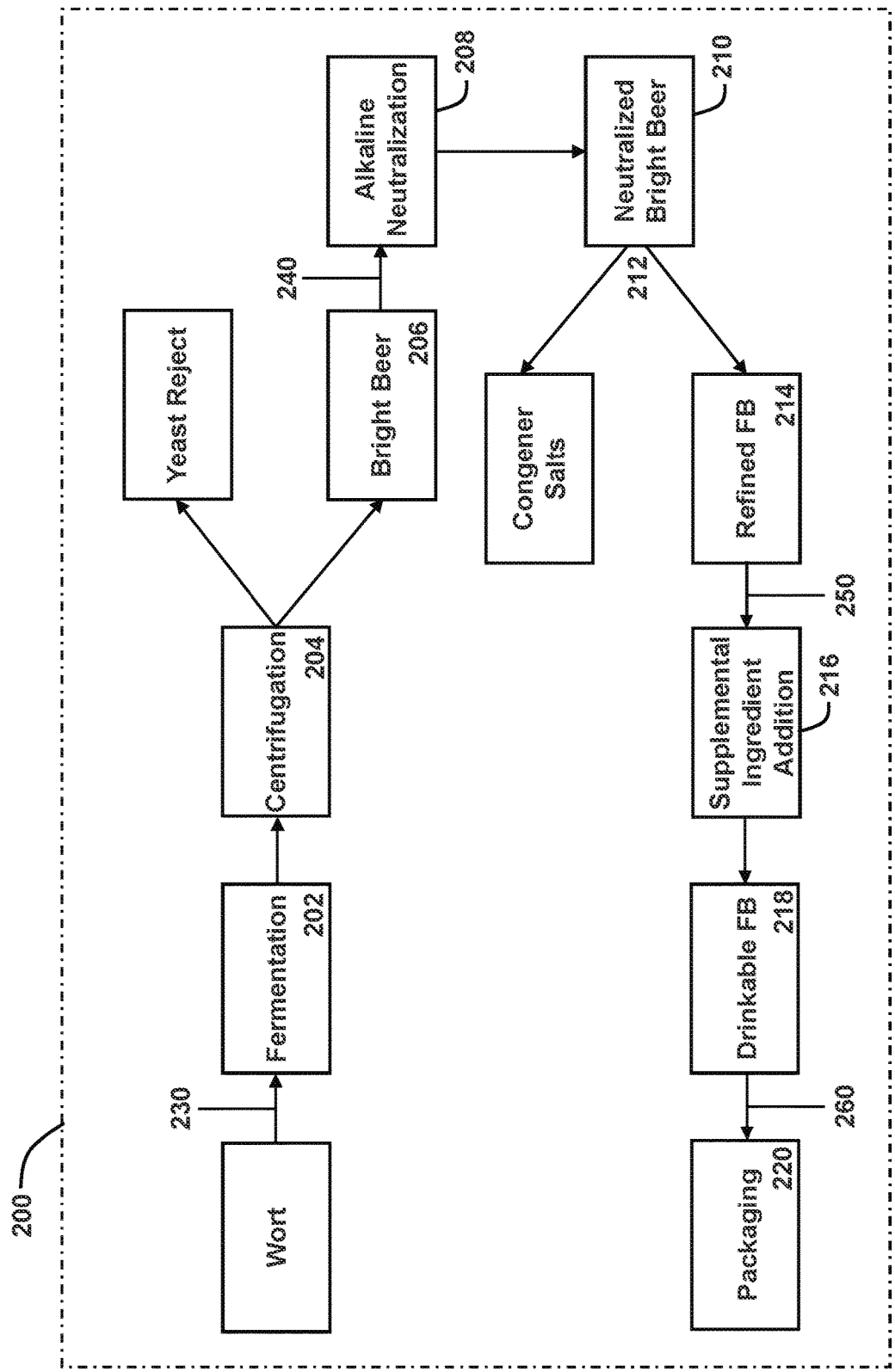
FIG. 9 shows a flowchart illustrating an exemplary process for fermenting a wort to ultimately produce a drinkable FB, comprising an alkaline treatment step and at least one UV treatment step.

One non-limiting example of a process 200 for producing a drinkable FB is shown in FIG. 9. Yeast is added to a provided wort to initiate a fermentation step 202. In some embodiments, the fermentation mixture also contains hop materials. The resulting fermentation product can be processed in a centrifuged step 204 to remove the spent yeast and other solid components, forming a bright beer as a supernatant. An alkaline treating agent is then added to the bright beer in a neutralization step 206 to form a neutralized bright beer. The neutralized bright beer is passed through one or more post-neutralization separation steps 212 to separate salts of the acidic congener, forming a refined FB. Finally, one or more supplemental ingredients are added to the refined FB in admix step 216 to form a drinkable FB, which is then sealed and packaged in packaging step 220. Also contained within the process are several optional UV-treatment steps, including step 230 of UV treating the wort prior to fermentation step 202, step 240 of UV treating the bright beer before alkaline neutralization step 208, step 250 of UV treating the refined FB after the separation step 212, and step 260 of UV treating the drinkable FB immediately prior to packaging. In some embodiments, the process for producing a drinkable FB comprises at least one UV treatment step. In some embodiments, the process for producing a drinkable FB comprises the UV treatment step 260. In some embodiments, the process for producing a drinkable FB comprises the UV treatment step 230. In some embodiments, the process for producing a drinkable FB comprises the UV treatment steps 230 and 260. In some embodiments, the process for producing a drinkable FB comprises each of the UV treatment steps 230, 240, 250, and 260.

While particular embodiments of the invention have been described, the invention can be further modified within the spirit and scope of this disclosure. Those skilled in the art will recognize, or be able to ascertain using no more than routine experimentation, numerous equivalents to the specific procedures, embodiments, claims, and examples described herein. As such, such equivalents are considered to be within the scope of the invention, and this application is therefore intended to cover any variations, uses or adaptations of the invention using its general principles. Further, the invention is intended to cover such departures from the present disclosure as come within known or customary practice in the art to which this invention pertains and which fall within the appended claims.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

The contents of all references, patents, and patent applications mentioned in this specification are hereby incorporated by reference, and shall not be construed as an admission that such reference is available as prior art to the present invention. All of the incorporated publications and patent applications in this specification are indicative of the level of ordinary skill in the art to which this invention pertains, and are incorporated to the same extent as if each individual publication or patent application was specifically indicated and individually indicated by reference.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. Thus, while the present invention has been described above with particularity, the following examples provide further detail in connection with what are presently deemed to be the most practical and preferred embodiments of the invention.

Example 1: Production of NMBs Using a Caustic Dosing System

An NMB is produced in accordance with embodiments of the present disclosure, using any of the caustic dosing systems described above. A bright beer containing acidic congeners is introduced into the caustic dosing system and a quantity of sodium hydroxide is added to the bright beer, with mixing, until a pre-determined target pH of the treated FB is reached, about 6.0. The treated FB is subsequently filtered through a reverse osmosis membrane to remove neutralized organic acids from the treated FB and form an NMB. Additional NMBs are produced using the same procedure, except with target pH's of 7.0 and 8.0, respectively.

Example 2: Physiochemical Analysis of the Acidity of NMBs

A study is conducted in accordance with embodiments of the present disclosure to determine the acidity and the extent of neutralization and removal of organic acids, particularly acetic acid, of NMBs produced by the caustic dosing system of Example 1. Each of the three NMBs produced in Example 1, as well as a sample of untreated bright beer, are evaluated for pH, titratable acidity, and acetic acid content. The pH of each FB sample is determined using a pH meter, either as a standalone instrument or disposed within the caustic dosing system. The titratable acidity of each FB sample is approximated by titrating a known concentration of sodium hydroxide to reach a pre-determined pH, such as for example, 8.2, 8.5, or 8.7, based on the original pH of the FB sample. The concentration of acetic acid in each FB sample, either in its protonated (acetic acid) or deprotonated (sodium acetate) form is determined by reacting a small volume of the FB sample with reagents included with the Megazyme® K-ACETRM acetic acid test kit, according to instructions included with the kit.

It is expected that the pH of the bright beer is approximately 4.0, and that the pH of the NMB samples is within 0.25 pH units of each of the pH targets—6.0, 7.0, and 8.0, respectively. Additionally, it is expected that the titratable acidity of the bright beer is greater than 1.00 g/L, and particularly greater than 2.00 g/L, while the titratable activity of each of the NMB samples exhibits at least an 80% decrease relative to the titratable activity of the bright beer. The extent of neutralization, exhibited by the titratable acidity of each of the NMB samples, is expected to increase as a function of the pH of the sample, with the NMB that is neutralized to a pH of 8.0 having least titratable activity relative to the other samples. Finally, it is expected that the total concentration of the protonated and deprotonated forms of acetic acid will decrease by at least 75% in each of the NMB FB samples, relative to the bright beer sample, with the greatest effect again being seen in the pH 8.0 FB sample. However, based on the actual pH of the NMB sample, the concentration of protonated acetic acid in each of the NMB samples is expected to be reduced by at least 95% relative to the bright beer sample.

Example 3: Determination of the Taste Profile of NMBs

A study is conducted in accordance with embodiments of the present disclosure to determine the organoleptic effects caused by the neutralization and removal of acetic acid from a bright beer. Participants in a sensory panel trained to distinguish the taste of vinegar notes resulting from the presence of protonated acetic acid are asked to sample each of the NMBs produced in Example 1 and score them according to a Likert-type scale. Likert-like scales used in taste and smell evaluation can ask participants to assign a score from 0 to 5, where each score is particularly defined, often with no half scores allowed. With respect to vinegar notes in particular, a Likert-type scale can have the following definitions: 0=no perceptible vinegar notes; 1=a hint of vinegar notes are perceptible; 2=vinegar notes are slightly perceptible; 3=vinegar notes are slightly-moderately perceptible; 4=vinegar notes are moderately perceptible; and 5=vinegar notes are moderately-strongly perceptible.

It is expected that untreated bright beer, having a relatively high concentration of protonated acetic acid, will exhibit average taste scores indicating a slight-moderate to moderate perception of vinegar notes. Upon treatment with sodium hydroxide, the average taste score of each of the treated samples is expected to be reduced relative to the bright beer and exhibit the same relationship as the titratable acidity and acetic acid concentrations determined in Example 2 with respect to pH, in that the NMB with a pH of 8.0 has the greatest reduction in the perception of vinegar notes relative to the other NMB samples. It is also expected that least one of the treated NMBs, particularly the NMB treated to a pH of 8.0, has no perceptible vinegar notes.

We claim:
1. A method for producing a refined fermented beverage (FB), comprising the steps of:
 (a) providing a bright beer composition comprising:
  i) an acidic congener comprising one or more organic acids, the one or more organic acids selected from the group consisting of: acetic acid; citric acid; lactic acid; propionic acid; butyric acid; caproic acid; valeric acid; isovaleric acid; succinic acid; and combinations thereof; and
  ii) a microbial contaminant, the microbial contaminant comprising one or more microorganisms selected from the group consisting of yeast, mold, viruses, bacteria, and combinations thereof;
(b) neutralizing at least a portion of the acidic congener by adding into the bright beer composition a sufficient amount of an alkaline treating agent to convert at least a portion of the organic acids into salts of the acidic congener;
(c) removing at least a portion of the salts of the acidic congener from the alkaline-treated bright beer to form a refined FB, using one or more separation systems selected from the group consisting of: ultrafiltration; nanofiltration; reverse osmosis filtration; adsorption using activated carbon or a sepiolite material; column distillation; vacuum distillation; multi-stage flash distillation; multiple-effect distillation; vapor-compression distillation; ion exchange chromatography, particularly cation exchange chromatography; gravitation; centrifugation; decantation; freeze-thaw systems; solar evaporation systems; and electrodialysis reversal; and
(d) treating at least one of the bright beer, alkaline-treated bright beer, or refined FB with ultraviolet (UV) light for a time sufficient to cause at least a 99% (log−2) kill of the microbial contaminant.

2. The method according to claim 1, wherein:
the acidic congener comprises acetic acid;
the sufficient amount of alkaline treating agent converts the acetic acid within the bright beer into an acetate salt, wherein the ratio of acetate salt to acetic acid within the alkaline-treated bright beer is in a range from at least about 50:50, up to about 99:1; and
at least a portion of the acetate salt is removed by the one or more separation processes, thereby forming a refined FB having a reduced level of acetic acid.

3. The method according to claim 2, wherein in addition to acetic acid, the acidic congener further comprises lactic acid and optionally, one or more organic acids selected from the group consisting of: tartaric acid, propionic acid, butyric acid, and a combination thereof.

4. The method according to claim 2, wherein the refined FB is a colorless, odorless, and flavorless neutral base alcohol, the neutral base alcohol selected from the group consisting of a neutral malt base (NMB), gluten-free base (GFB), sugar-brew base, grain-neutral spirit base, and a gluten-reduced base.

5. The method according to claim 4, wherein the neutral base alcohol comprises: at least 10%, and up to 20%, by volume of ethyl alcohol; an acetic acid concentration of less than 100 ppm; a titratable acidity, relative to acetic acid, of less than 0.5 grams per liter; and a pH in the range of 5.8 to 6.5.

6. The method according to claim 4, wherein the method further comprises the step of adding one or more supplemental ingredients to the neutral base alcohol to form a flavored FB, the one or more supplemental ingredients selected from the group consisting of: water, juice, sweeteners, flavorants, diluents, stabilizer, acidulants, pH-adjusting agents, and combinations thereof.

7. The method according to claim 6, wherein the flavored FB has an alcohol content by volume (ABV) of at least 3%, and up to 10%.

8. The method according to claim 7, wherein the flavored FB comprises less than 25 ppm of acetic acid.

9. The method according to claim 6, wherein the flavored FB is a hard seltzer.

10. The method according to claim 6, wherein the flavored FB further comprises a secondary microbial contaminant, and the method further comprises a finishing step, the finishing step consisting of the following sub-steps:
  i) treating the flavored FB with UV light for a time sufficient to cause at least a log−2 kill of the secondary microbial contaminant, thereby forming a UV-treated flavored FB;
  ii) dispensing the UV-treated FB into a container; and
  iii) sealing the container.

11. The method according to claim 10, wherein the flavored FB is a hard seltzer.

12. The method according to claim 1, wherein the step (d) comprises treating the bright beer.

13. The method according to claim 1, wherein the step (d) comprises treating the alkaline-treated bright beer.

14. The method according to claim 1, wherein the step (d) comprises treating the refined FB.

* * * * *